(12) United States Patent
Matsumura et al.

(10) Patent No.: US 9,363,515 B2
(45) Date of Patent: *Jun. 7, 2016

(54) IMAGE PROCESSING METHOD, IMAGE PROCESSING APPARATUS, VIDEO ENCODING/DECODING METHODS, VIDEO ENCODING/DECODING APPARATUSES, AND NON-TRANSITORY COMPUTER-READABLE MEDIA THEREFOR THAT PERFORM DENOISING BY MEANS OF TEMPLATE MATCHING USING SEARCH SHAPE THAT IS SET IN ACCORDANCE WITH EDGE DIRECTION OF IMAGE

(75) Inventors: Masaaki Matsumura, Yokosuka (JP);
Seishi Takamura, Yokosuka (JP);
Atsushi Shimizu, Yokosuka (JP);
Hirohisa Jozawa, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 351 days.

This patent is subject to a terminal disclaimer.

(21) Appl. No.: 14/002,921

(22) PCT Filed: Mar. 7, 2012

(86) PCT No.: PCT/JP2012/055748
§ 371 (c)(1),
(2), (4) Date: Sep. 3, 2013

(87) PCT Pub. No.: WO2012/121269
PCT Pub. Date: Sep. 13, 2012

(65) Prior Publication Data
US 2013/0343470 A1 Dec. 26, 2013

(30) Foreign Application Priority Data
Mar. 9, 2011 (JP) ................. 2011-051443

(51) Int. Cl.
*H04N 7/12* (2006.01)
*H04N 19/82* (2014.01)
(Continued)

(52) U.S. Cl.
CPC .......... *H04N 19/00896* (2013.01); *G06T 5/002* (2013.01); *G06T 5/20* (2013.01);
(Continued)

(58) Field of Classification Search
CPC .......... H04N 19/00896; H04N 19/117; H04N 19/14; H04N 19/17; H04N 19/80; H04N 19/82; H04N 5/142; H04N 5/21; G06T 5/002; G06T 5/20
USPC ..................................................... 375/240.29
See application file for complete search history.

(56) References Cited

U.S. PATENT DOCUMENTS 6,950,930 B2    9/2005   Wise et al.
7,388,621 B2    6/2008   Hsu
(Continued)

FOREIGN PATENT DOCUMENTS

CA          2 828 930 A1      9/2012
CN          101707716 A       5/2010
(Continued)

OTHER PUBLICATIONS

Wang, Lei, et al., "Nonlocal Image Denoising Algorithm based on Image Statistic," 2010 IEEE International Conference on Progress in Informatics and Computing, Dec. 10, 2010, pp. 901-905.
(Continued)

*Primary Examiner* — Gims Philippe
*Assistant Examiner* — Benjamin Pezzner
(74) *Attorney, Agent, or Firm* — Harness, Dickey & Pierce, P.L.C.

(57) ABSTRACT

In an image processing apparatus, an edge direction detection unit calculates an edge direction using a denoising target image. A search shape setting unit sets a search shape in which the number of search points along the direction perpendicular to the edge direction is smaller than the number of search points along the edge direction, using the calculated edge direction as an index used for limiting the search shape. When noise of a target pixel is removed with a weight in accordance with the degree of template similarity between a template for the target pixel and a template for each of search points within a search shape and the weighted sum of pixel values at the search points, a filter execution unit executes a process of performing template matching on only search points within the set search shape and removing the noise of the target pixel.

9 Claims, 24 Drawing Sheets

(51) Int. Cl.
| | |
|---|---|
| H04N 5/14 | (2006.01) |
| H04N 5/21 | (2006.01) |
| G06T 5/00 | (2006.01) |
| G06T 5/20 | (2006.01) |
| H04N 19/117 | (2014.01) |
| H04N 19/14 | (2014.01) |
| H04N 19/17 | (2014.01) |
| H04N 19/80 | (2014.01) |

(52) U.S. Cl.
CPC ............... *H04N 5/142* (2013.01); *H04N 5/21* (2013.01); *H04N 19/117* (2014.11); *H04N 19/14* (2014.11); *H04N 19/17* (2014.11); *H04N 19/80* (2014.11); *H04N 19/82* (2014.11)

(56) References Cited

U.S. PATENT DOCUMENTS

| | | |
|---|---|---|
| 7,751,482 B1 | 7/2010 | Srinivasan et al. |
| 2006/0056722 A1 | 3/2006 | Moroney |
| 2008/0031518 A1 | 2/2008 | Song et al. |
| 2008/0056366 A1 | 3/2008 | Bhaskaran |
| 2009/0161988 A1 | 6/2009 | Wredenhagen |
| 2010/0254454 A1 | 10/2010 | Nakagawa |
| 2010/0272182 A1 | 10/2010 | Watanabe |
| 2013/0136371 A1 | 5/2013 | Ikai et al. |
| 2013/0208794 A1 | 8/2013 | Jeong et al. |
| 2013/0336393 A1* | 12/2013 | Matsumura ...... H04N 19/00896 375/240.03 |

FOREIGN PATENT DOCUMENTS

| | | |
|---|---|---|
| JP | 10-051793 A | 2/1998 |
| JP | 2008-205737 A | 9/2008 |
| JP | 2010-057157 A | 3/2010 |
| KR | 10-1998-0066891 A | 10/1998 |
| RU | 2 358 410 C2 | 6/2009 |
| RU | 2 402 070 C2 | 10/2010 |
| RU | 2 406 259 C2 | 12/2010 |
| RU | 2 408 159 C1 | 12/2010 |
| RU | 2 409 005 C2 | 1/2011 |
| WO | 2008/075247 A1 | 6/2008 |
| WO | 2009/133844 A1 | 11/2009 |

OTHER PUBLICATIONS

Huang, Yu-Wen, et al., "TE1: Decoder-Side Motion Vector Derivation with Switchable Template Matching," Joint Collaborative Team on Video Coding (JCT-VC) of ITU-T SG16 WP3 and ISO/IEC JTC1/SC29/VVG11, No. JCTVC-B076, 2nd Meeting: Geneva, Switzerland, Jul. 21-28, 2010.
Notice of Allowance, Taiwanese Patent Application No. 101107618, Feb. 26, 2015.
Notice of Allowance of Patent, Korean Patent Application No. 10-2013-7020222, Feb. 2, 2015.
Decision on Grant, Russian Patent Application No. 2013140678, Feb. 9, 2015.
Office Action, Canadian Patent Application No. 2,827,625, Mar. 3, 2015.
International Search Report, Application No. PCT/JP2012/055787, Jun. 12, 2012.
Search Report, European Patent Application No. 12754377.5, Sep. 30, 2014.
Decision on Grant, Russian Patent Application No. 2013140540, May 8, 2015.
Office Action, U.S. Appl. No. 14/000,624, Jul. 29, 2015.
Protter, Matan, et al., "Generalizing the Nonlocal-Means to Super-Resolution Reconstruction," IEEE Transactions on Image Processing, vol. 18, No. 1, Jan. 2009, pp. 36-51.
Goossen, Andre, et al., "Medical X-ray image enhancement by intra-image and inter-image similarity," Proceedings of SPIE, vol. 7259, Medical Imaging 2009: Image Processing, Mar. 27, 2009.
Matsumura, Masaaki, et al., "Modifications of in-loop filter based on non-local means filter," Joint Collaborative Team on Video Coding (JCT-VC) of ITU-T SG16 WP3 and ISO/IEC JTC1/SC29/WG11, Doc. JCTVC-F047, 6th Meeting: Torino, Italy, Jul. 14-22, 2011.
Search Report, European Patent Application No. 12754719.8, Sep. 30, 2014.
A. Buades, B. Coll, and J. M. Morel, "A non-local algorithm for image denoising", Proc. IEEE Int. Conf. on Computer Vision and Pattern Recognition, vol. 2, pp. 60-65, Jun. 2005.
Thomas Wiegand, Woo-Jin Han, Benjamin Bross, Jens-Rainer Ohm, and Gary J. Sullivan, "WD1: Working Draft 1 of High-Efficiency Video Coding", ITU-T SG16 WP3 and ISO/IEC JTC1/SC29/WG11 3rd Meeting: Guangzhou, CN, Oct. 7-15, 2010.
Jin Wang et al., Fast non-local algorithm for image denoising, 2006 IEEE International Conference on Image Processing, IEEE, Oct. 8, 2006, p. 1429-1432.
Ming Li, An improved non-local filter for image denoising, International Conference on Information Engineering and Computer Science, 2009, ICIECS 2009., IEEE, Dec. 19, 2009, p. 1-4.
Rui Lai and Xuan-xuan Dou, Improved non-local means filtering algorithm for image denoising, 2010 3rd International Congress on Image and Signal Processing (CISP2010), IEEE, Oct. 16, 2010, vol. 2, p. 720-722.
Wen-Qiang Feng et al., A non-local bilateral filter for image denoising, 2010 International Conference on Apperceiving Computing and Intelligence Analysis (ICACIA2010), IEEE, Dec. 17, 2010, p. 253-257.
Takeshi Chujoh et al., Description of video coding technology proposal by Toshiba, Joint Collaborative Team on Video Coding (JCT-VC) of ITU-T SG16 WP3 and ISO/IEC JTC1/SC29/WG11 1st Meeting: Dresden, DE, Document: JCTVC-A117, ITU-T, Apr. 2010.
Masaaki Matsumura et al., In-loop filter based on non-local means filter, Joint Collaborative Team on Video Coding (JCT-VC) of ITU-T SG16 WP3 and ISO/IEC JTC1/SC29/WG11 5th Meeting: Geneva, CH, Document: JCTVC-E206, ITU-T, Mar. 10, 2011.
International Search Report for PCT/JP2012/055748, ISA/JP, mailed Jun. 12, 2012, with translation.
Notice of Allowance, Korean Patent Application No. 10-2013-7021110, May 28, 2015.
Office Action, Chinese Patent Application No. 201280011668.5, Jan. 7, 2016.

\* cited by examiner

|  -1 |  | 1 |
|---|---|---|
|  -2 |  | 2 |
|  -1 |  | 1 | dx

| -1 | -2 | -1 |
|---|---|---|
|  |  |  |
| 1 | 2 | 1 | dy $$VecIndex = \begin{cases} 0 & if \quad |dx|+|dy| < Th \\ 6 & else\ if \quad dy = 0 \\ 6 & else\ if \quad dx/dy < -8.0 \\ 7 & else\ if \quad dx/dy < -2.0 \\ 8 & else\ if \quad dx/dy < -1.0 \\ 9 & else\ if \quad dx/dy < -0.5 \\ 10 & else\ if \quad dx/dy < -0.125 \\ 1 & else\ if \quad dx/dy < 0.125 \\ 2 & else\ if \quad dx/dy < 0.5 \\ 3 & else\ if \quad dx/dy < 1.0 \\ 4 & else\ if \quad dx/dy < 2.0 \\ 5 & else\ if \quad dx/dy < 8.0 \\ 6 & else \end{cases}$$

FIG. 15A
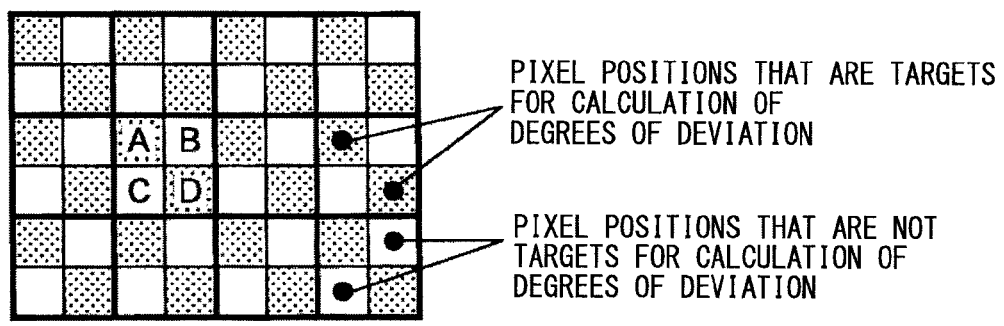
FIG. 15B
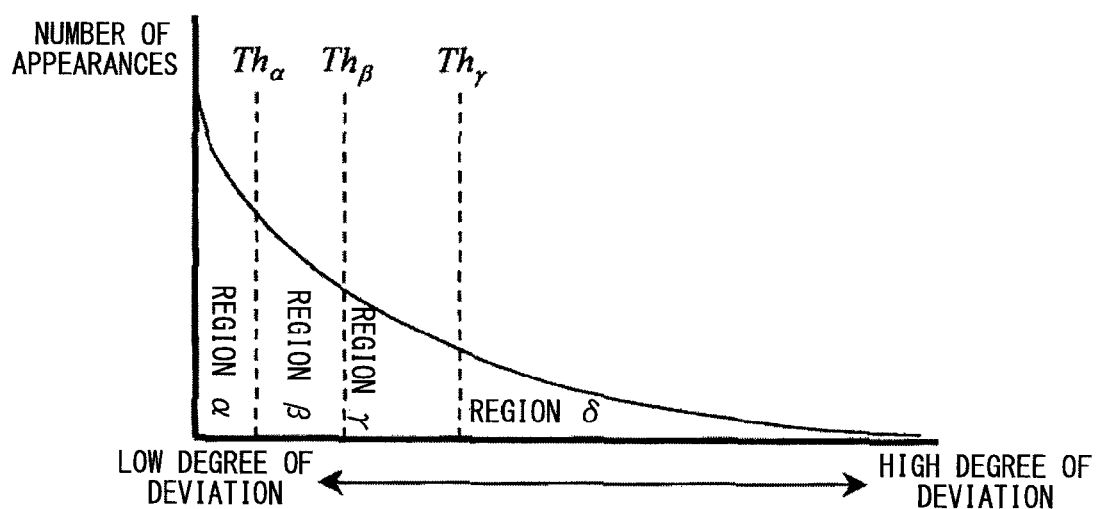
FIG. 16

SEARCH SHAPE (AGGREGATE OF SEARCH POINTS)

IMAGE PROCESSING METHOD, IMAGE PROCESSING APPARATUS, VIDEO ENCODING/DECODING METHODS, VIDEO ENCODING/DECODING APPARATUSES, AND NON-TRANSITORY COMPUTER-READABLE MEDIA THEREFOR THAT PERFORM DENOISING BY MEANS OF TEMPLATE MATCHING USING SEARCH SHAPE THAT IS SET IN ACCORDANCE WITH EDGE DIRECTION OF IMAGE

CROSS-REFERENCE TO RELATED APPLICATIONS

This application is a 371 U.S. National Stage of International Application No. PCT/JP2012/055748, filed Mar. 7, 2012. Priority is claimed on Japanese Patent Application No. 2011-051443, filed Mar. 9, 2011. The entire contents of both applications are incorporated herein by reference.

TECHNICAL FIELD

The present invention relates to an image processing technology which reduces noise when an image is taken and a deterioration of a deteriorated image.

BACKGROUND ART

Terms used in the present description are defined as follows.
  "Search shape": an aggregate of search points around a target pixel of template matching, or the shape formed by the aggregate.
  "Template shape": a group of pixels used for calculating the degree of similarity between the target pixel and each search point when the template matching is performed, or the shape formed by the group of pixels. The same shape is used for a group of pixels around the target pixel and for a group of pixels around each search point, and the values of pixels at positions having the same relative positional relationship are compared with each other.

In the field of image processing, as a technique of reducing noise when an image is taken and a deterioration of a deteriorated image, various denoising filters have been proposed. Among other things, it is known that denoising filters in accordance with a non-local means method (refer to Non-Patent Document 1) demonstrate a high denoising effect. Hereinafter, denoising filters in accordance with the non-local means method are referred to as NLM filters.

FIG. 26 is a diagram describing an NLM filter. In FIG. 26, one square cell is a search point, and an aggregate of search points is a search shape. $P_0$ is a denoising target pixel, and $P_s$ is a pixel of a search point in a search target. $T_0$ and $T_s$ are template shapes, and the shape of the template shape $T_0$ of a comparison source is the same as that of the template shape $T_s$ of the search target.

In the NLM filter, corresponding pixels in the template shape $T_0$ of the comparison source and the template shape $T_s$ of the search target are compared with each other, and the degree of similarity between the templates is calculated. In general, calculation of the degree of similarity between templates uses a sum of squared difference (SSD) or a sum of absolute difference (SAD).

FIG. 27 is a diagram illustrating inputs and an output of an NLM filter execution unit. Basically, an NLM filter execution unit 1000 inputs four pieces of information including a denoising target image, a search shape, a template shape, and a denoising coefficient and generates a resultant denoised image. As the denoising coefficient, a variance is given as a typical value when an original image, to which no noise is applied, is available, and an appropriate value is set by a user when an original image is unavailable.

The NLM filter execution unit 1000 calculates a denoised pixel value for each pixel as follows. In the following, an example which uses SSD for calculating the degree of similarity between templates will be described.
  (1) Variable SW of the sum of weights is initialized to 0 and variable SP of the sum of pixel values is initialized to 0.
  (2) The following processes are repeated for all the search points within a search shape.
  (2-1) SSD is calculated as the degree of similarity between templates.
  (2-2) Weight W=exp (−SSD/denoising coefficient)
  (2-3) Sum of weights SW=sum of weights SW+weight W
  (2-4) Sum of pixel values SP=sum of pixel values SP+weight W×(pixel value of search point)
  (3) Upon completion of the processes of (2) for all the search points within the search shape, a denoised pixel value of a denoising target pixel is obtained by the following equation.

(denoised pixel value)=sum of pixel values SP/sum of weights SW

The NLM filter execution unit 1000 performs a denoising process using a single value and a single shape for all the pixels of a denoising target image when a single value is given as each of the input denoising coefficient, the input search shape, and the input template shape, and performs a denoising process while switching a value and shapes for each corresponding point when a group of pieces of data corresponding to each pixel is given.

Moreover, in order to remove coding distortion, a denoising filter with a deblocking filter is installed in the "HM", which is a test model of "High Efficiency Video Coding" of next-generation video coding standards, for which international standardization activities are currently being performed by the "Moving Picture Experts Group (MPEG)" and the Video Coding Experts Group (VCEG)" (refer to Non-Patent Document 2).

PRIOR ART DOCUMENTS

Non-Patent Documents

Non-Patent Document 1: A. Buades, B. Coll, and J. M. Morel, "A non-local algorithm for image denoising", Proc. IEEE Int. Conf. on Computer Vision and Pattern Recognition, vol. 2, pp. 60-65, June, 2005.

Non-Patent Document 2: Thomas Wiegand, Woo-Jin Han, Benjamin Bross, Jens-Rainer Ohm, and Gary J. Sullivan, "WD1: Working Draft 1 of High-Efficiency Video Coding", ITU-T SG16 WP3 and ISO/IEC JTC1/SC29/WG11 3rd Meeting: Guangzhou, CN, 7-15 Oct., 2010.

SUMMARY OF INVENTION

Problems to be Solved by the Invention

As described above, in order to remove coding distortion, a denoising filter with a deblocking filter is installed in the "HM" of the "High Efficiency Video Coding" of the next-generation video coding standards, but it is conceivable that the coding efficiency be increased compared to conventional deblocking filters if the above NLM filter is introduced into the HM.

However, the computational complexity of the NLM filter is enormous, so that there is a possibility that a computation time required for decoding is greatly increased if a decoding apparatus calculates NLM filters for all the pixels.

As described above, template matching is performed on each denoising target pixel and each search point within an arbitrary search shape using an arbitrary template shape to calculate the degree of similarity between templates. As a result, assuming that, for example, the template shape is an N×N block and the search shape is M×M, the computational complexity of the order of $N^2 \times M^2$ is required for performing a denoising calculation for one pixel. Therefore, in order to use the NLM filter in a decoding apparatus and so on, a technology of reducing the computational complexity is required.

An object of the present invention is to solve the above problems and provide a technology of reducing the computational complexity of a denoising filter while suppressing a reduction in coding efficiency. It is to be noted that as the coding efficiency, for example, a BD-rate, which is one of international evaluation techniques and is calculated from the image quality and the amount of bits, is used herein.

Means for Solving the Problems

In order to solve the above problems, the present invention executes the following processes in image processing which performs template matching between a template which is a comparison source for a denoising target pixel in a denoising target image and a template for each of search points which are search targets within a search shape in the denoising target image and removes noise of the target pixel using weights in accordance with the degrees of similarity between the templates and the weighted sum of pixel values at the search points.

(1) An edge direction is calculated using the denoising target image.
(2) A search shape in which the number of search points along the direction perpendicular to the edge direction is smaller than the number of search points along the edge direction is set using the calculated edge direction as an index used for limiting the search shape.
(3) The template matching is performed on only each search point within the set search shape and a process of removing the noise of the target pixel is executed.

Moreover, the present invention applies the above image processing to a loop filter (corresponding to a conventional deblocking filter) in video encoding or decoding.

Furthermore, in the present invention, the following processes may be executed in addition to the above processes (1) to (3) when the above image processing is applied to the loop filter in the video encoding or decoding.

(4) The degree of deviation between the target pixel and a surrounding pixel of the target pixel is calculated using a decoded image.
(5) The degree of deviation is used as an index used for limiting a template shape of a template, and a process of limiting the template shape is executed so that the lower the degree of deviation relative to the maximum value of the degree of deviation within the decoded image is, the smaller the template shape is.

Moreover, the following process (6) may be further added.

(6) An excessively allocated region in the template shape limited by the process (5) is detected, and the template shape is reset to further limit the template shape.

As described above, the process (1) detects the edge direction in the denoising target image, and the process (2) limits the search shape for each pixel in the denoising target image so as to maintain the search points along the edge direction of the process (1) and reduce the search points along the direction perpendicular to the edge direction. As a result, it is possible to reduce the computational complexity of a denoising filter.

Moreover, it is possible to reduce the computational complexity of a loop filter while suppressing a reduction in coding efficiency by combining the above image processing with video encoding/decoding processing and applying them to the loop filter. Furthermore, although conventionally a template shape is uniquely given for the entire frame as a fixed value, it is possible to reduce the computational complexity of template matching by introducing a process of limiting a template shape for each pixel with the above processes (4) and (5). Additionally, it is possible to further reduce the computational complexity by further executing the process (6).

Advantageous Effects of Invention

The following are advantageous effects of the present invention.
1. Reduction in computational complexity of a denoising filter The present invention limits a search shape and reduces the number of search points which are targets for template matching, so that the number of calculations for the template matching is reduced and it is possible to reduce the computational complexity.
2. Reduction in computational complexity of the denoising filter which can be realized when the denoising filter is combined with video encoding/decoding Moreover, it is possible to realize a reduction in computational complexity while suppressing a reduction in coding efficiency by applying the present invention to a loop filter in the video encoding/decoding.

Furthermore, introduction of a process of limiting a template shape to reduce the number of pixels in templates between which comparison is performed results in a reduction in the number of comparisons between the pixels, so that it is possible to reduce the computational complexity. That is, since template matching is performed at each search point, a combination of a technique of limiting a search region with a technique of limiting the template shape makes it possible to synergistically reduce the computational complexity because calculation of a further limited template shape is performed within the limited search shape.

BRIEF DESCRIPTION OF DRAWINGS

FIG. 15A is a diagram describing an example of a deviation degree detection method.

FIG. 15B is a diagram describing the example of the deviation degree detection method.

FIG. 16 is a diagram illustrating a histogram of degrees of deviation as well as the relationship between thresholds and the setting of regions.

MODES FOR CARRYING OUT THE INVENTION

Hereinafter, embodiments of the present invention will be described with reference to drawings.

[First Embodiment]

Figure 1:
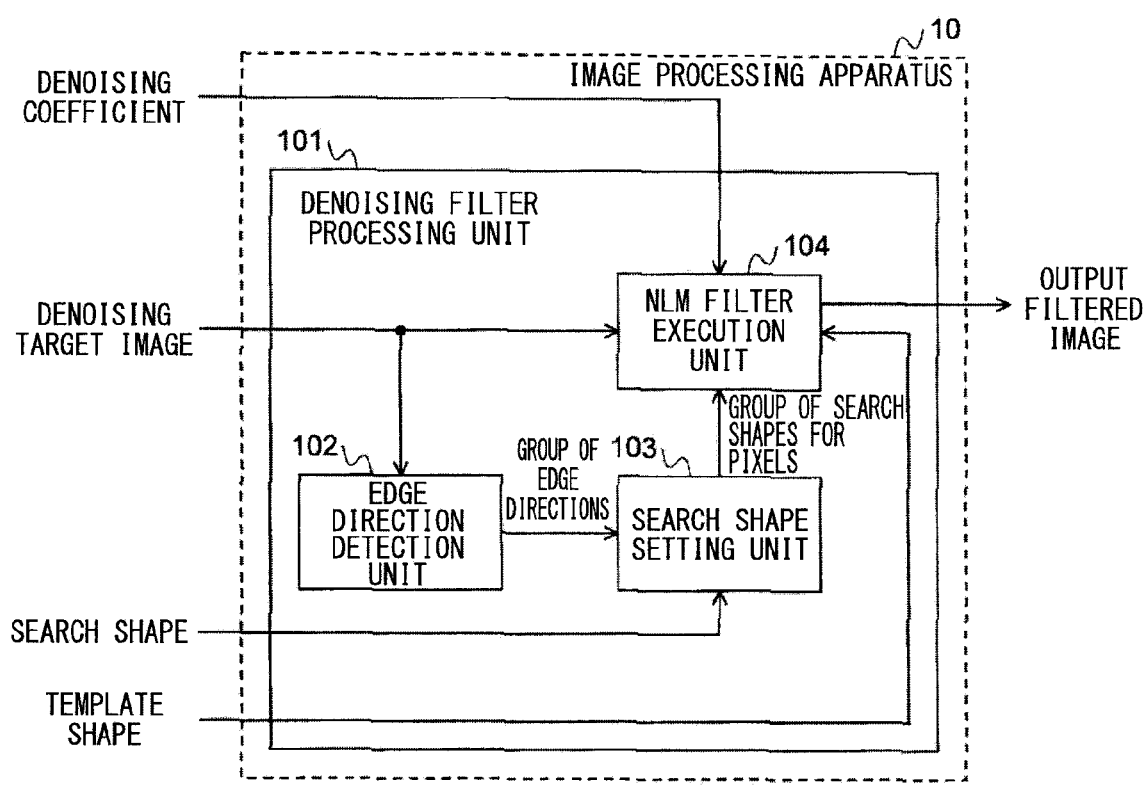
FIG. 1 is a diagram illustrating an example of a configuration of an image processing apparatus in accordance with a first embodiment of the present invention.

FIG. 1 is a diagram illustrating an example of a configuration of an image processing apparatus in accordance with a first embodiment of the present invention. An image processing apparatus 10 is provided with a denoising filter processing unit 101 which includes an edge direction detection unit 102, a search shape setting unit 103, and an NLM filter execution unit 104.

In this image processing apparatus 10, the denoising filter processing unit 101 inputs four pieces of information including a denoising coefficient, a search shape, a template shape, and a denoising target image and outputs a filtered image, from which noise has been removed.

The edge direction detection unit 102 detects edge directions of the denoising target image and outputs a group of edge directions corresponding to pixels in the denoising target image. As an example of the edge directions, there is a group of numbers or a group of angles that are numbered in accordance with the directions.

The search shape setting unit 103 inputs the search shape, sets the input search shape as the maximum shape, and outputs a group of search shapes corresponding to the pixels in the denoising target image. The group of search shapes for the pixels has a shape in which the number of search points along the edge direction is maintained and search points along the direction perpendicular to the edge direction are reduced.

The NLM filter execution unit 104 inputs the denoising target image, the denoising coefficient, the template shape, and the group of search shapes for the pixels set by the search shape setting unit 103 and outputs a denoised image. The processing performed by this NLM filter execution unit 104 is similar to that of a conventional NLM filter disclosed in Non-Patent Document 1.

Figure 2:
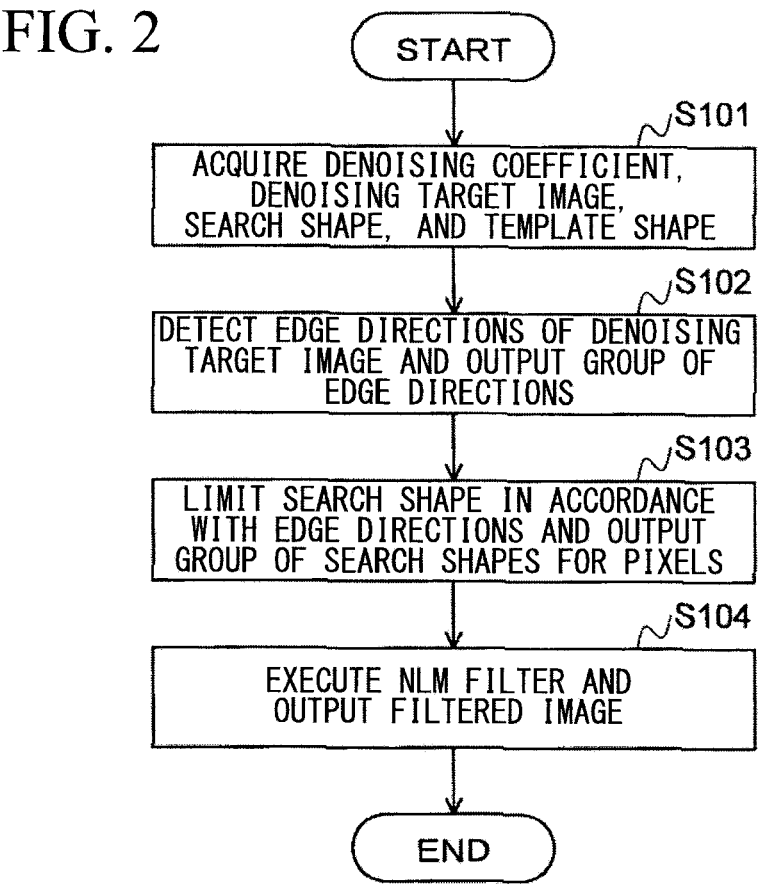
FIG. 2 is a flowchart of the processing of the image processing apparatus of the first embodiment.

FIG. 2 a flowchart of the processing of the image processing apparatus 10 illustrated in FIG. 1. First, in step S101, the denoising filter processing unit 101 acquires each piece of information including the denoising coefficient, the denoising target image, the search shape, and the template shape, which are input from the outside.

In step S102, the edge direction detection unit 102 detects edge directions of the denoising target image and outputs a group of edge directions. Subsequently, in step S103, the search shape setting unit 103 limits the input search shape in accordance with the edge directions detected by the edge direction detection unit 102 and outputs a group of search shapes for pixels. When the input search shape is treated as the maximum shape, the output group of search shapes has search shapes that are smaller than that of the input search shape. Finally, in step S104, the NLM filter execution unit 104 executes an NLM filter in accordance with the set information and outputs a resultant filtered image.

Figure 3:
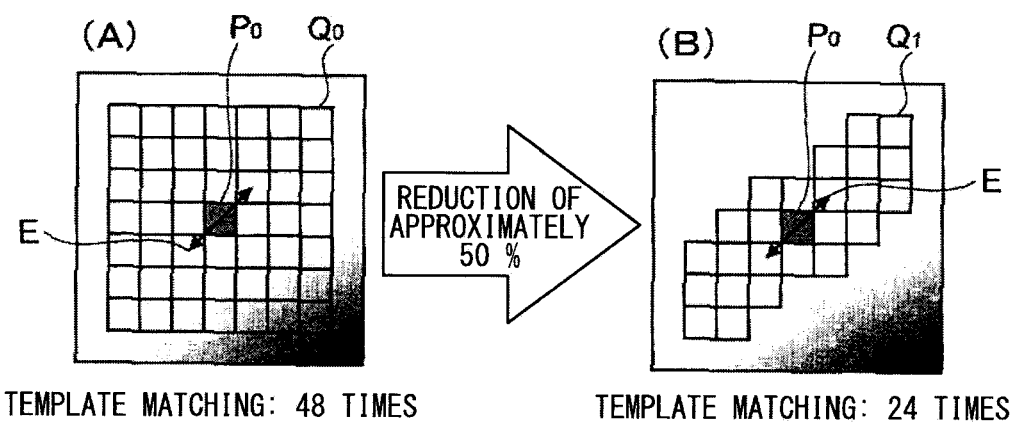
FIG. 3 is a diagram describing a reduction in computational complexity of a denoising filter due to a reduction in search shape.

FIG. 3 is a diagram describing a reduction in computational complexity of a denoising filter due to a reduction in search shape. In FIG. 3, $P_0$ denotes a denoising target pixel, E denotes a detected edge direction, $Q_0$ denotes a search shape before reduction (the maximum range), and $Q_1$ denotes a search shape after reduction.

Conventionally, for example, as shown in FIG. 3 (A), the search shape $Q_0$ was uniquely given for the entire frame as a fixed value. In contrast, in the present embodiment, the edge direction detection unit 102 detects the edge direction E in a denoising target image and the search shape setting unit 103 sets the search shape $Q_1$, in which search points along the edge direction E are maintained and search points along the direction perpendicular to the edge direction E are reduced as shown in FIG. 3 (B), thereby introducing a process of limiting the search shape on a pixel-by-pixel basis.

Figure 27:
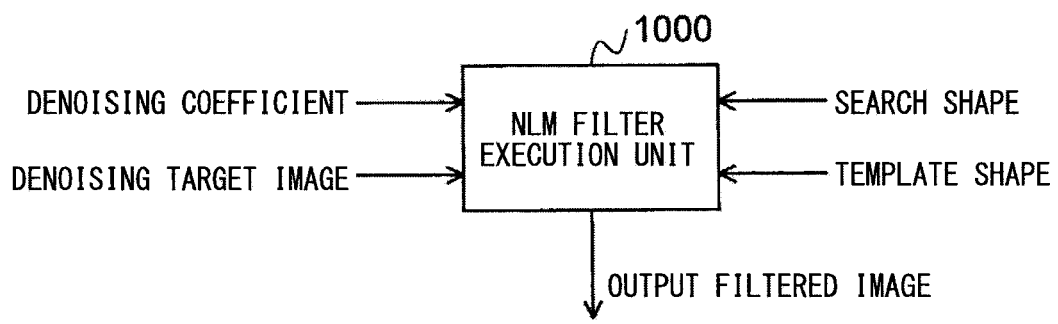
FIG. 27 is a diagram illustrating inputs and an output of an NLM filter execution unit.

It is to be noted that in the template matching, the denoising target pixel $P_0$ is excluded from calculation targets. This is because SSD and SAD, which are indices for the degree of similarity between templates, necessarily become 0 and W that is equal to 1.0 is necessarily output as a weight in the NLM filter process described with reference to FIG. 27. Therefore, while template matching for the search shape $Q_0$ before reduction is performed 48 times, template matching for the search shape $Q_1$ after reduction is performed 24 times, and thus the computational complexity is reduced by approximately 50%.

[Second Embodiment]

Figure 4:
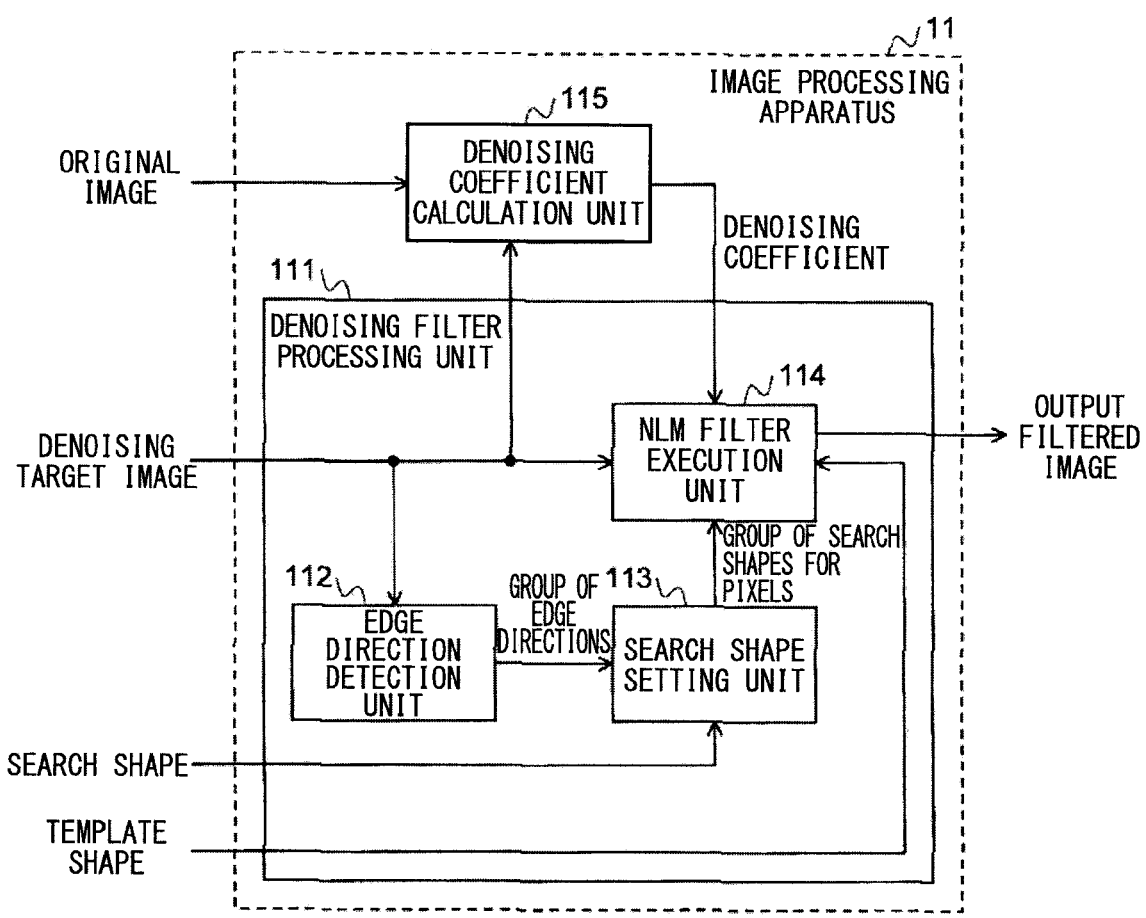
FIG. 4 is a diagram illustrating an example of a configuration of an image processing apparatus in accordance with a second embodiment of the present invention.

FIG. 4 is a diagram illustrating an example of a configuration of an image processing apparatus in accordance with a second embodiment of the present invention. An image processing apparatus 11 is provided with: a denoising filter processing unit 111 including an edge direction detection unit 112, a search shape setting unit 113, and an NLM filter execution unit 114; and a denoising coefficient calculation unit 115.

This image processing apparatus 11 is different from the image processing apparatus 10 in accordance with the first embodiment in that the denoising coefficient calculation unit 115, which inputs an original image, to which no noise is applied, and calculates a denoising coefficient, is provided. The configuration of the denoising filter processing unit 111 is the same as that of the denoising filter processing unit 101 of the first embodiment.

Figure 5:
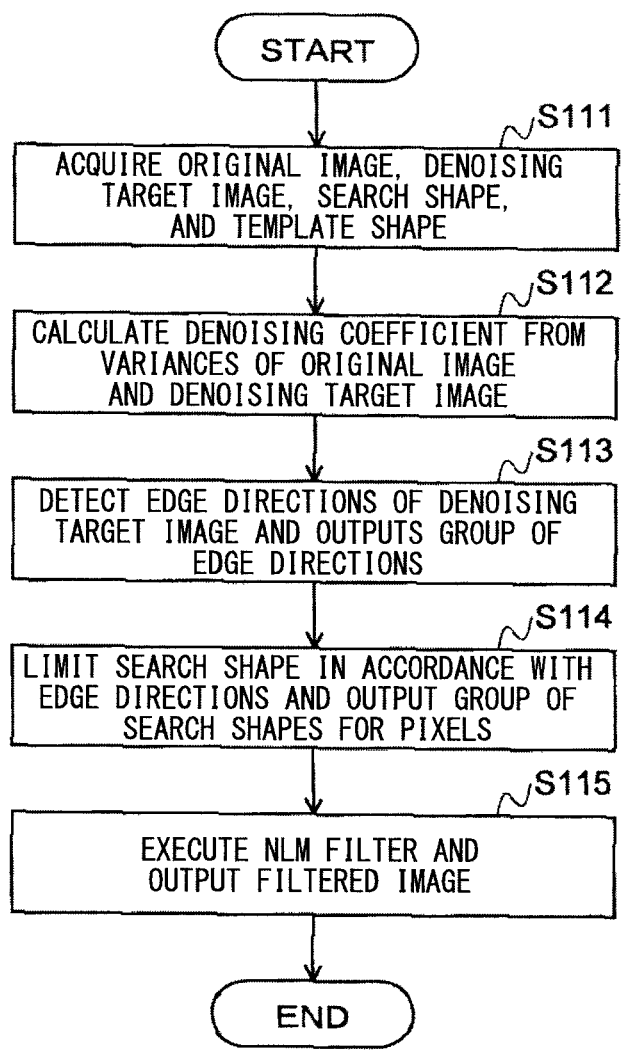
FIG. 5 is a flowchart of the processing of the image processing apparatus of the second embodiment.

FIG. 5 is a flowchart of the processing of the image processing apparatus 11 shown in FIG. 4. First, in step S111, the image processing apparatus 11 acquires each piece of information including an original image, a denoising target image, a search shape, and a template shape, which are input from the outside.

In step S112, the denoising coefficient calculation unit 115 calculates a denoising coefficient from variances of the input original image and the denoising target image and notifies the NLM filter execution unit 114 of the calculated denoising coefficient. In step S113, the edge direction detection unit 112 detects edge directions of the denoising target image and outputs a group of edge directions. Subsequently, in step S114, the search shape setting unit 113 limits the input search shape in accordance with the edge directions detected by the edge direction detection unit 112 and outputs a group of search shapes for pixels. When the input search shape is treated as the maximum shape, the output group of search shapes has search shapes that are smaller than that of the input search shape. Finally, in step S115, the NLM filter execution unit 114 executes an NLM filter in accordance with the set information and outputs a resultant filtered image.

[Third Embodiment]

Figure 6:
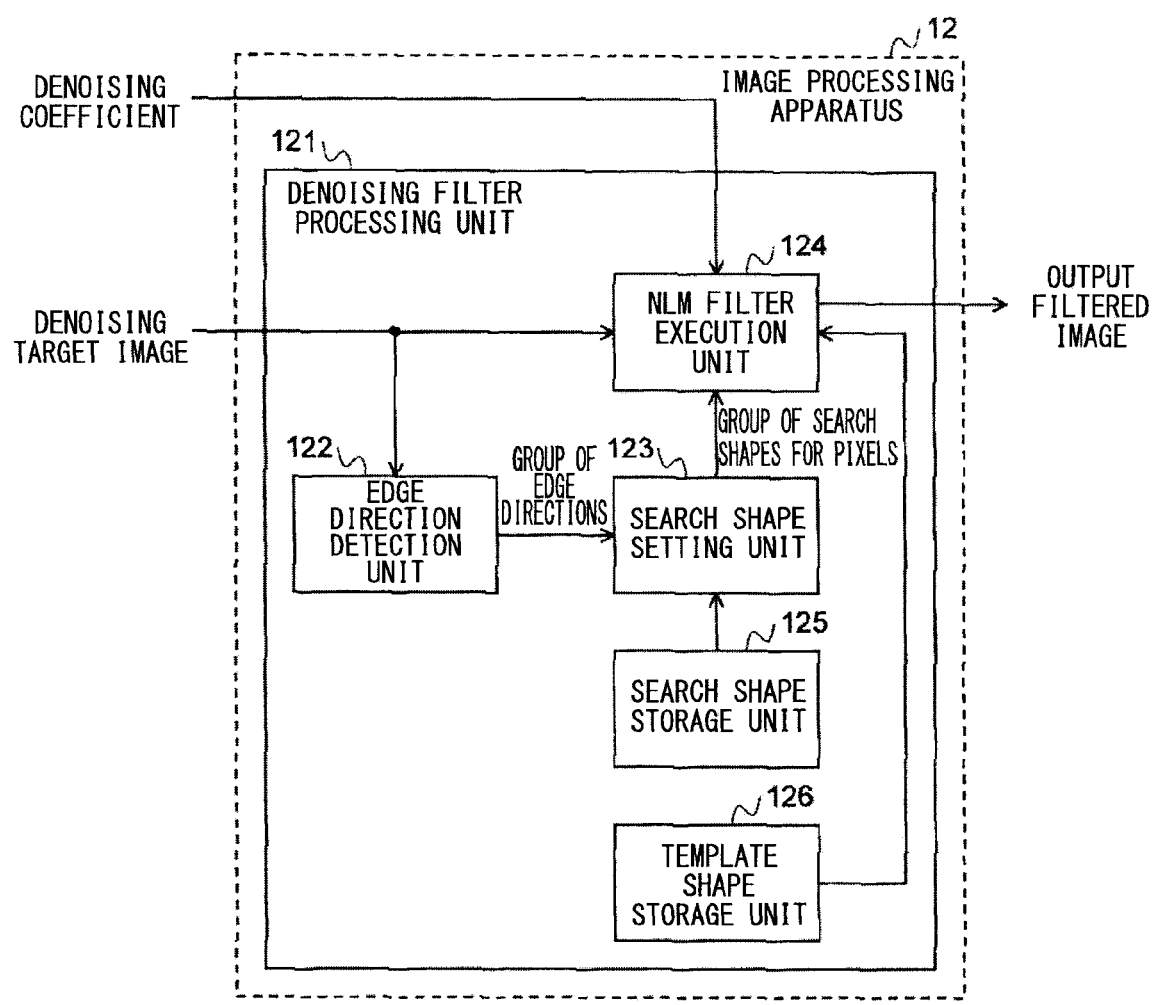
FIG. 6 is a diagram illustrating an example of a configuration of an image processing apparatus in accordance with a third embodiment of the present invention.

FIG. 6 is a diagram illustrating an example of a configuration of an image processing apparatus in accordance with a third embodiment of the present invention. An image processing apparatus 12 is provided with a denoising filter processing unit 121 including an edge direction detection unit 122, a search shape setting unit 123, an NLM filter execution unit 124, a search shape storage unit 125, and a template shape storage unit 126.

This image processing apparatus 12 is different from the above-described image processing apparatus 10 in accordance with the first embodiment in that only a denoising coefficient and a denoising target image are input and fixed values retained in the denoising filter processing unit 121 are used as a search shape and a template shape.

That is, the denoising filter processing unit 121 uses the fixed search shape and the fixed template shape stored in the search shape storage unit 125 and the template shape storage unit 126, respectively, instead of a search shape and a template shape which are input from the outside. The configurations of the edge direction detection unit 122, the search shape setting unit 123, and the NLM filter execution unit 124 are the same as those described in the first embodiment.

[Fourth Embodiment]

In the above-described third embodiment, the denoising filter processing unit 121 retains both the search shape and the template shape as the fixed values, but an implementation in which only one of the search shape and the template shape is retained as a fixed value and the other is made variable by inputting it from the outside is also possible. In addition, an implementation in which a denoising coefficient calculation unit is further provided in the third embodiment, like the second embodiment, and a denoising coefficient is calculated from an original image can be employed. Since the basic flow of the processing is similar to those of the examples described in the first embodiment and the second embodiment, a detailed description of the processing is omitted.

[Example 1 of Edge Direction Detection Method]

As one of examples of the edge direction detection methods in the edge direction detection units 102, 112, and 122, an example in which a Sobel filter is applied to a decoded image to detect an edge direction and a number allocated in accordance with the direction is output will be given.

Figures 7A, 7B, 7C:
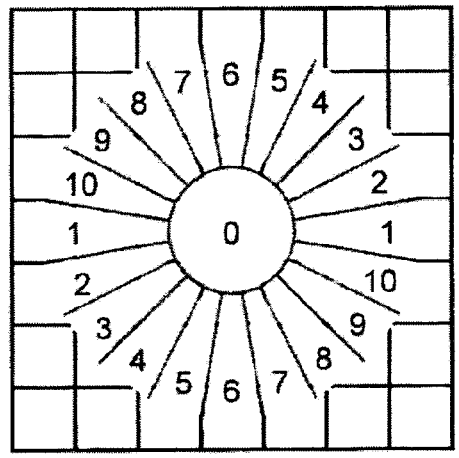
FIG. 7A is a diagram describing a Sobel operator in an example of an edge direction detection method.
FIG. 7B is a diagram describing numbers in accordance with directions in the example of the edge direction detection method.
FIG. 7C is a diagram describing a method for allocating the numbers in the example of the edge direction detection method.

FIG. 7A to FIG. 7C are diagrams describing the example of the edge direction detection methods (the Sobel filter and numbers in accordance with directions). A Sobel operator as shown in FIG. 7A is applied to surrounding pixels, and numbers VecIndices (0 to 10) are allocated in accordance with detected edge directions as shown in FIG. 7B. At this time, a single threshold Th is set, 0 is allocated as VecIndex if the absolute sum of components in the x-axis and the y-axis (dx and dy) is smaller than the threshold Th because it is considered that no strong edge exists in a target pixel, and numbers are output as a group of edge directions.

FIG. 7C illustrates an algorithm for allocating a number.

If |dx|+|dy|<Th, VecIndex=0.

If the above condition is not satisfied and dy=0, VecIndex=6.

If the above conditions are not satisfied and dx/dy<−8.0, VecIndex=6.

If the above conditions are not satisfied and dx/dy<−2.0, VecIndex=7.

If the above conditions are not satisfied and dx/dy<−1.0, VecIndex=8.

If the above conditions are not satisfied and dx/dy<—0.5, VecIndex=9.

If the above conditions are not satisfied and dx/dy<−0.125, VecIndex=10.

If the above conditions are not satisfied and dx/dy<0.125, VecIndex=1.

If the above conditions are not satisfied and dx/dy<0.5, VecIndex=2.

If the above conditions are not satisfied and dx/dy<1.0, VecIndex=3.

If the above conditions are not satisfied and dx/dy<2.0, VecIndex=4.

If the above conditions are not satisfied and dx/dy<8.0, VecIndex=5.

If none of the above conditions are satisfied, VecIndex=6.

In order to reduce the influence of mosquito noise due to a discrete cosine transform (DCT) and noise at the time of taking an image and to reduce the computational complexity, it is also effective to apply a Sobel filter to an image obtained by scaling-down an input denoising target image to 1/N in the vertical direction and the horizontal direction instead of the input denoising target image, which is not scaled down.

When the Sobel filter is applied to the image scaled down to 1/N, an output calculation result of the Sobel filter is treated as a typical value of a group of a plurality of pixels used in the scaling-down.

[Example 1 of Search Shape Setting Method]

As one of examples of the search shape setting methods in the search shape setting units 103, 113, and 123, an example of a search shape reduction method for all the points of a reference search shape of a 5×5 block that is given from an apparatus using the group of edge directions having the edge direction numbers VecIndices described with reference to FIG. 7B to FIG. 7C will be described.

Figure 8:
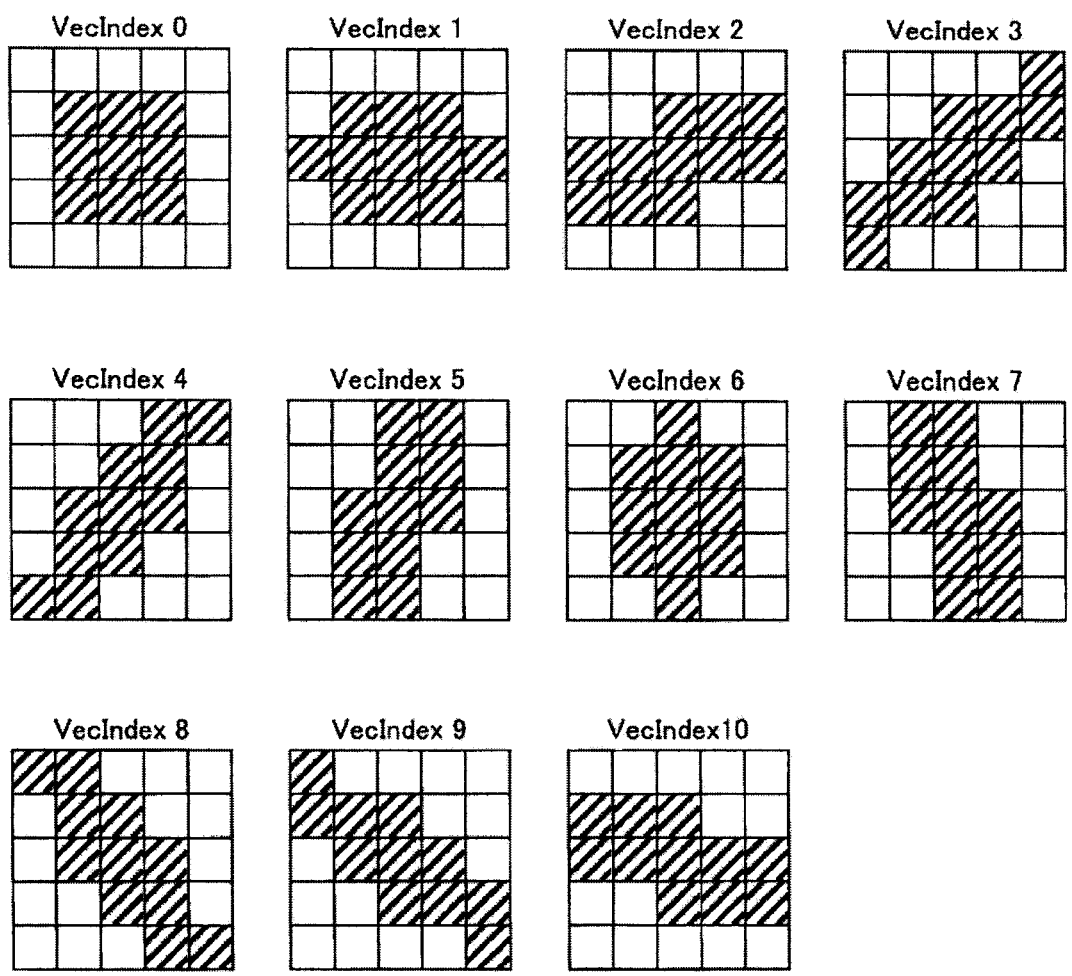
FIG. 8 is a diagram illustrating an example of the setting of a search shape in accordance with an edge direction number.

The search shape setting units 103, 113, and 123 set search points shown in FIG. 8 in accordance with the group of edge directions received from the edge direction detection units 102, 112, and 122. In 5×5 blocks of FIG. 8, hatching portions are reduced search shapes.

5×5 block, the computational complexity becomes ⅓ for VecIndex=0, and the computational complexity becomes 5/12 for the other VecIndices. When all VecIndices appear equally, the theoretical value thereof is a little over ⅖.

[Simulation Results]

The following are results obtained by calculating an edge direction for each 2×2 block of a target image that has been reduced to ½ in the vertical direction and the horizontal direction and performing a simulation with the setting shown below using the techniques recited in the example 1 of the edge direction detection method and the example 1 of the search shape setting method. It is to be noted that the denoising coefficient is the best value obtained by a repetitive calculation that repeats an NLM filter a plurality of times so as to maximize a peak signal-to-noise ratio (PSNR).

With respect to denoising target images, random noise in the range from +5 to −5 was added to a luminance signal of each of sequences shown below, and evaluation was performed in terms of the average of PSNR-Ys and the average of processing times after filtering.

<Simulation Conditions>

Sequences: BasketballDrive, BQTerrace, Cactus, and ParkScene
(Full-HD: 1920×1080)
Target frames: first 10 frames of each sequence
Search shape: 5×5 block
Template shape: 3×3 block <Average Processing Time Required for NLM Filter>

TABLE 1

Average Processing Time Required for NLM Filter

| Sequence | PSNR-Y [dB] | | Processing Time [msec] | | PSNR-Y Present Technique − Conventional Technique | Processing Time Present Technique/ Conventional Technique |
|---|---|---|---|---|---|---|
| | Conventional Technique | Present Technique | Conventional Technique | Present Technique | | |
| BasketballDrive | 41.55 | 41.47 | 529.41 | 230.51 | −0.080 | 0.44 |
| BQTerrace | 40.31 | 40.34 | 529.14 | 253.79 | 0.030 | 0.48 |
| Cactus | 40.09 | 40.56 | 530.16 | 240.82 | 0.470 | 0.45 |
| ParkScene | 41.10 | 41.18 | 567.34 | 240.10 | 0.080 | 0.42 |
| Average | 40.76 | 40.89 | 539.01 | 241.31 | 0.125 | 0.45 |

The reason for doing so is as follows. As a calculation technique of an NLM filter, a mechanism which calculates SSD or SAD, which is an index for the degree of similarity between templates, using template matching and sets weights having exponential gains for the index is employed. Therefore, in the surroundings of a sharp edge, it is possible to effectively find a position where the degree of similarity is high by performing sampling along the direction of the edge. In contrast, the degree of similarity is greatly reduced at a position distant from the edge, and thus the weights become small values and an influence on calculation of a weighted sum is small. Therefore, the sampling is intensively performed along the direction of the edge, so that it is possible to reduce the computational complexity while suppressing a deterioration in the denoising effect.

It is to be noted that in the example of FIG. 8, SSD and SAD, which are treated as indices for the degree of similarity between templates, at the center position of a 5×5 block are always zero, and thus this point is excluded from calculation targets. Accordingly, while the calculation targets are 24 points in total when the search points are all the points of a It can be seen from Table 1 that a delay is generated due to influences of detection of an edge direction and conditional branches as a result of application of the direction generated for each 2×2 block in a target image that has been reduced to ½ in the vertical direction and the horizontal direction, but the time required for all the filters can be reduced to approximately 45% on average without greatly reducing the PSNR. Among the sequences, there are sequences in which a PSNR is further increased on average by intensively performing sampling along an edge direction.

[Example 2 of Edge Direction Detection Method]

As another example of the edge direction detection methods in the edge direction detection units 102, 112, and 122, an example which applies a Sobel filter to a denoising target image to detect an edge direction and outputs an angle in radians (Radian) will be given. The above-described Sobel operator shown in FIG. 7A is applied to surrounding pixels, and the angle in radians is calculated from components in the x axis and the y-axis (dx and dy) using arc tan ($-\pi/2$ to $\pi/2$). At this time, when the absolute sum of dx and dy is smaller than a threshold Th, a value (EXatan: e.g., 100) outside the output range of arc tan ($-\pi/2$ to $\pi/2$) is set.

That is, the angle in radians (Radian) is defined as follows.

If |dx|+|dy|<Th, Radian=EXatan.

If the above condition is not satisfied and dy=0, Radian=π/2.

Otherwise, Radian=arc tan (dx/dy).

[Example 2 of Search Shape Setting Method]

As another example of the search shape setting methods in the search shape setting units 103, 113, and 123, an exemplary method for reducing a search shape of an N×N block given from an apparatus for all the points of the search shape using a group of edge directions in units of an angle in radians described in the example 2 of the edge direction detection method will be described.

Figure 9A:
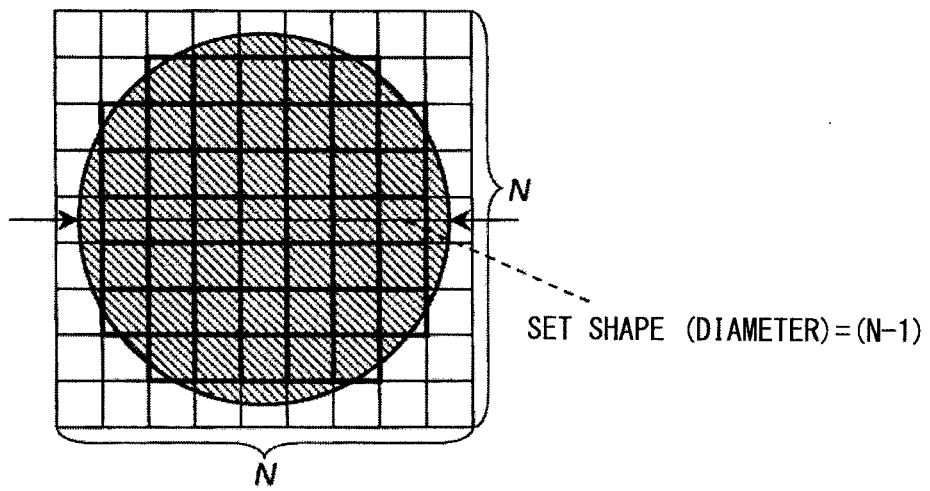
FIG. 9A is a diagram illustrating an example of the setting of a search shape in accordance with an angle in radians.
Figure 9B:
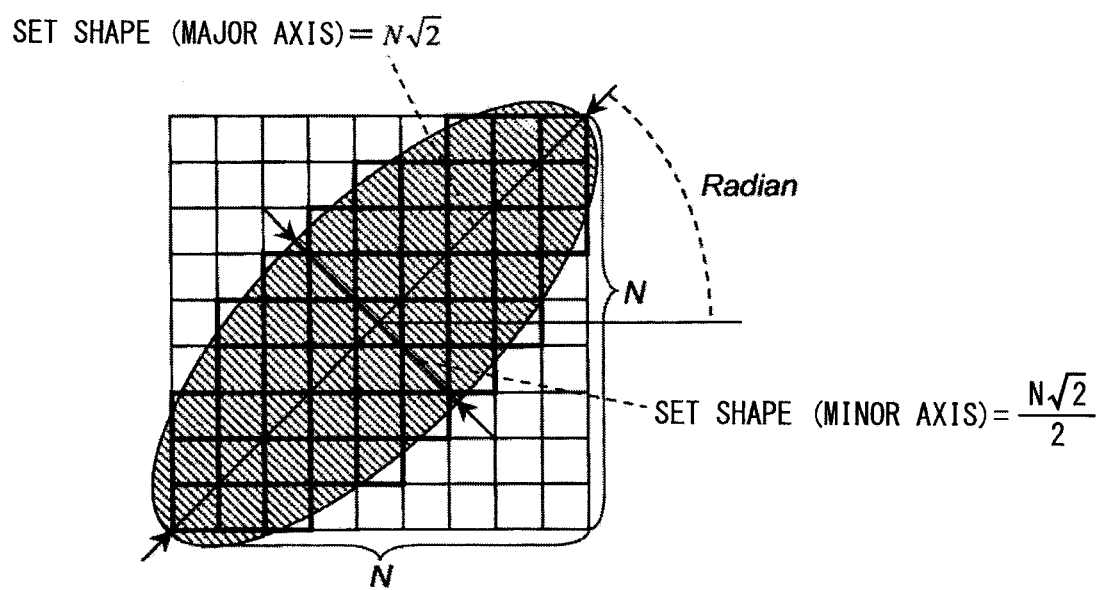
FIG. 9B is a diagram illustrating an example of the setting of a search shape in accordance with an angle in radians.

FIG. 9A to FIG. 9B are diagrams illustrating an example of the setting of a search shape in accordance with an angle in radians. The search shape setting units 103, 113, and 123 set search points within a circle or an ellipse shown in FIG. 9A to FIG. 9B as a search shape in accordance with an angle in radians received from the edge direction detection units 102, 112, and 122.

If the angle in radians (Radian) is EXatan, the search points within the circle are set as a search shape in which the diameter of the set shape is (N-1), as shown in FIG. 9A.

Moreover, if the angle in radians (Radian) is other than EXatan, search points within an ellipse are set as a search shape in which the major axis of the set shape is (N×2$^{1/2}$) and the minor axis of the set shape is (N×2$^{-1/2}$), as shown in FIG. 9B.

[Fifth Embodiment]

Figure 10:
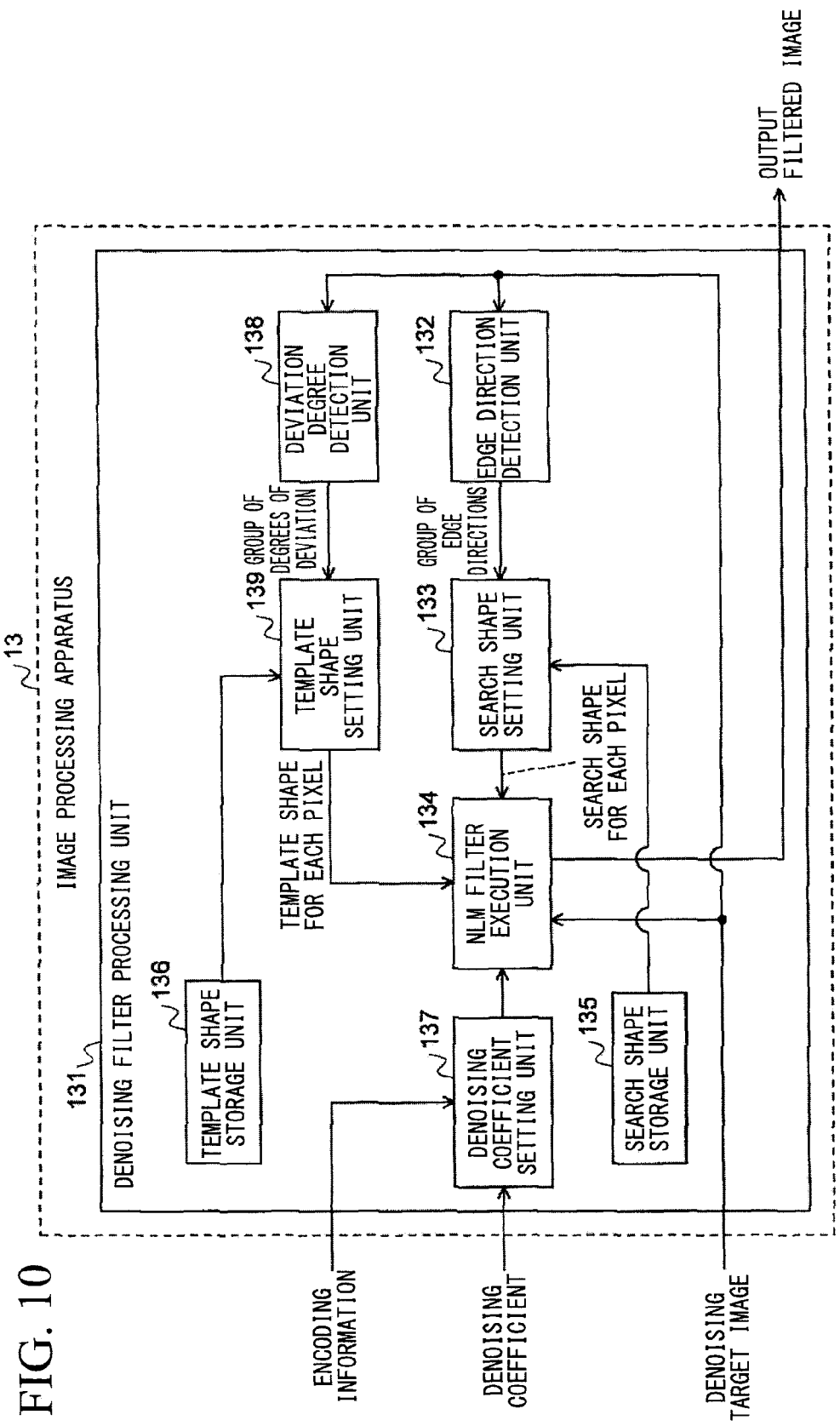
FIG. 10 is a diagram illustrating an example of a configuration of an image processing apparatus in accordance with a fifth embodiment of the present invention.

FIG. 10 is a diagram illustrating an example of a configuration of an image processing apparatus in accordance with a fifth embodiment of the present invention. An image processing apparatus 13 is provided with a denoising filter processing unit 131 which includes an edge direction detection unit 132, a search shape setting unit 133, an NLM filter execution unit 134, a search shape storage unit 135, a template shape storage unit 136, a denoising coefficient setting unit 137, a deviation degree detection unit 138, and a template shape setting unit 139.

The fifth embodiment illustrates an example of the image processing apparatus 13 which is used as a loop filter in a video encoding apparatus or a video decoding apparatus. The fundamental functions of the edge direction detection unit 132, the search shape setting unit 133, the NLM filter execution unit 134, the search shape storage unit 135, and the template shape storage unit 136 in the denoising filter processing unit 131 are the same as those of the above-described first to fourth embodiments.

The denoising coefficient setting unit 137 generates denoising coefficients which correspond to pixel positions of a denoising target image using a reference denoising coefficient and encoding information, which are given from the outside. In general, in a medium rate to a low rate, block noise begins to be noticeable at unit boundaries of a prediction processing unit PredictionUnit and a transform processing unit TransformUnit, and thus denoising coefficients at pixel positions in the vicinity of these boundaries are set so as to be higher than those inside a block, using the encoding information.

The deviation degree detection unit 138 and the template shape setting unit 139 are provided for the purpose of introducing a process of limiting a template shape on a pixel-by-pixel basis. In conventional NLM filters, a template shape is generally given as a fixed value for the entire frame. In contrast, in the present embodiment, as pre-processing of an NLM filter by the NLM filter execution unit 134, the deviation degree detection unit 138 detects the degrees of deviation from surrounding pixels for each of pixels of the denoising target image, and the template shape setting unit 139 classifies the degrees of deviation detected by the deviation degree detection unit 138 into multiple levels and sets the template shape (large to small) of each of the pixels in accordance with the degree of deviation (high to low).

Figure 11:
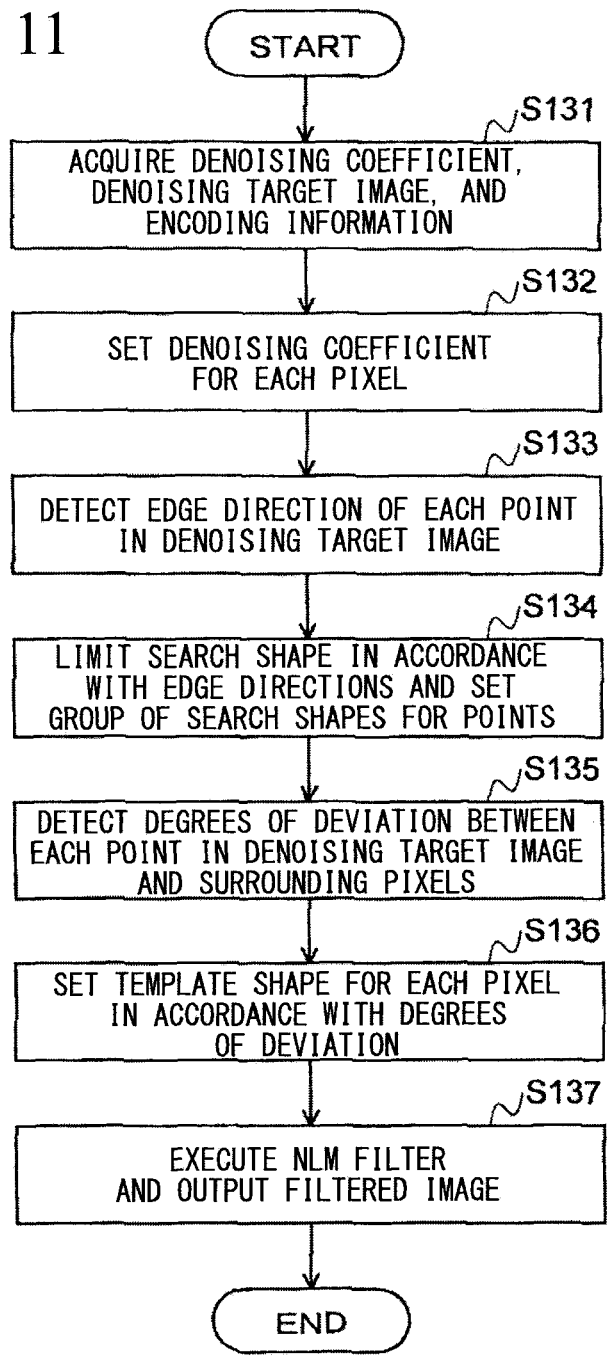
FIG. 11 is a flowchart of the processing of the image processing apparatus of the fifth embodiment.

FIG. 11 is a flowchart of the processing of the image processing apparatus 13 shown in FIG. 10. First, in step S131, the denoising filter processing unit 131 acquires a denoising coefficient, a denoising target image, and encoding information that are input from the outside.

In step S132, the denoising coefficient setting unit 137 sets denoising coefficients which correspond to pixel positions of the denoising target image from the input reference denoising coefficient and the input encoding information.

Next, in step 5133, the edge direction detection unit 132 detects edge directions of the denoising target image and outputs a group of edge directions. In step S134, the search shape setting unit 133 limits a search shape input from the search shape storage unit 135 in accordance with the edge directions detected by the edge direction detection unit 132 and sets a group of search shapes for pixels. When the input search shape is treated as the maximum shape, the set group of search shapes has search shapes that are smaller than that of the input search shape.

In step S135, the deviation degree detection unit 138 inputs the denoising target image, calculates the degrees of deviation between a target pixel and surrounding pixels, and outputs a group of degrees of deviation which corresponds to each pixel. In step S136, the template shape setting unit 139 sets and outputs a limited template shape which corresponds to each pixel using the group of degrees of deviation and a predetermined template shape stored in the template shape storage unit 136. When the template shape is limited, the input template shape is treated as the maximum shape, and a limitation is applied so that the lower the degree of deviation is, the smaller the template shape is.

Finally, in step S137, the NLM filter execution unit 134 executes an NLM filter in accordance with the set information and outputs a resultant filtered image.

Figure 12:
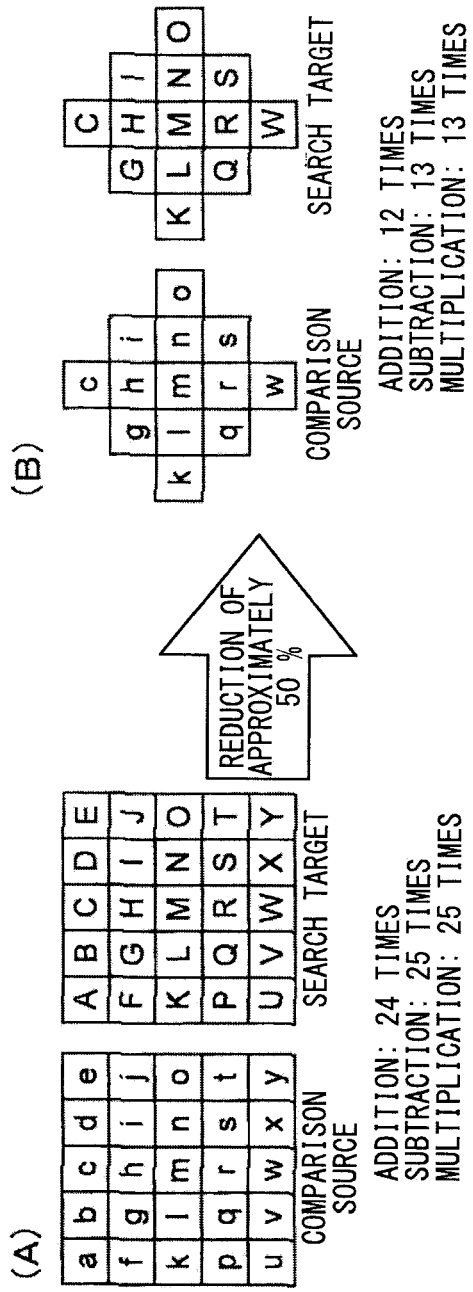
FIG. 12 is a diagram describing an example of limiting a template shape by a template shape setting unit.

FIG. 12 is a diagram describing an example of limiting a template shape by the template shape setting unit 139. For example, it is assumed that a template shape designated from the outside is a 5×5 block as shown in FIG. 12 (A). This template shape is limited in accordance with the degrees of deviation, as shown, for example, in FIG. 12 (B). When SSD is used as the degree of similarity between templates, operations including 24 additions, 25 subtractions, and 25 multiplications are required for the original template shape; in contrast, by limiting the template shape as shown in FIG. 12 (B), only operations including 12 additions, 13 subtractions, and 13 multiplications are required, and thus the computational complexity is reduced by approximately 50%.

The processing by the denoising filter processing unit 131 aims at removal of noise due to coding, and it does not assume removal of noise that is uniformly applied to the entirety of a frame from the frame like general image processing. Noise due to coding (coding distortion) can be roughly classified into the following types.

1. Disappearance of a pattern due to smoothing
2. Mosquito noise around an edge due to DCT
3. Block noise generated at unit boundaries of PredictionUnit and TransformUnit Of these, the present embodiment does not aim at restoring a pattern lost by smoothing because it is very difficult to do so. If an NLM filter is applied to such a smoothed region, in which there is no change in pixel value, the computational complexity therefor is required despite there is almost no change between a pixel signal before the calculation and a pixel signal after the calculation. The present embodiment calculates the degrees of deviation from surrounding pixels to reduce the computational complexity that is also allocated to such a smoothed region.

[Sixth Embodiment]

Figure 13:
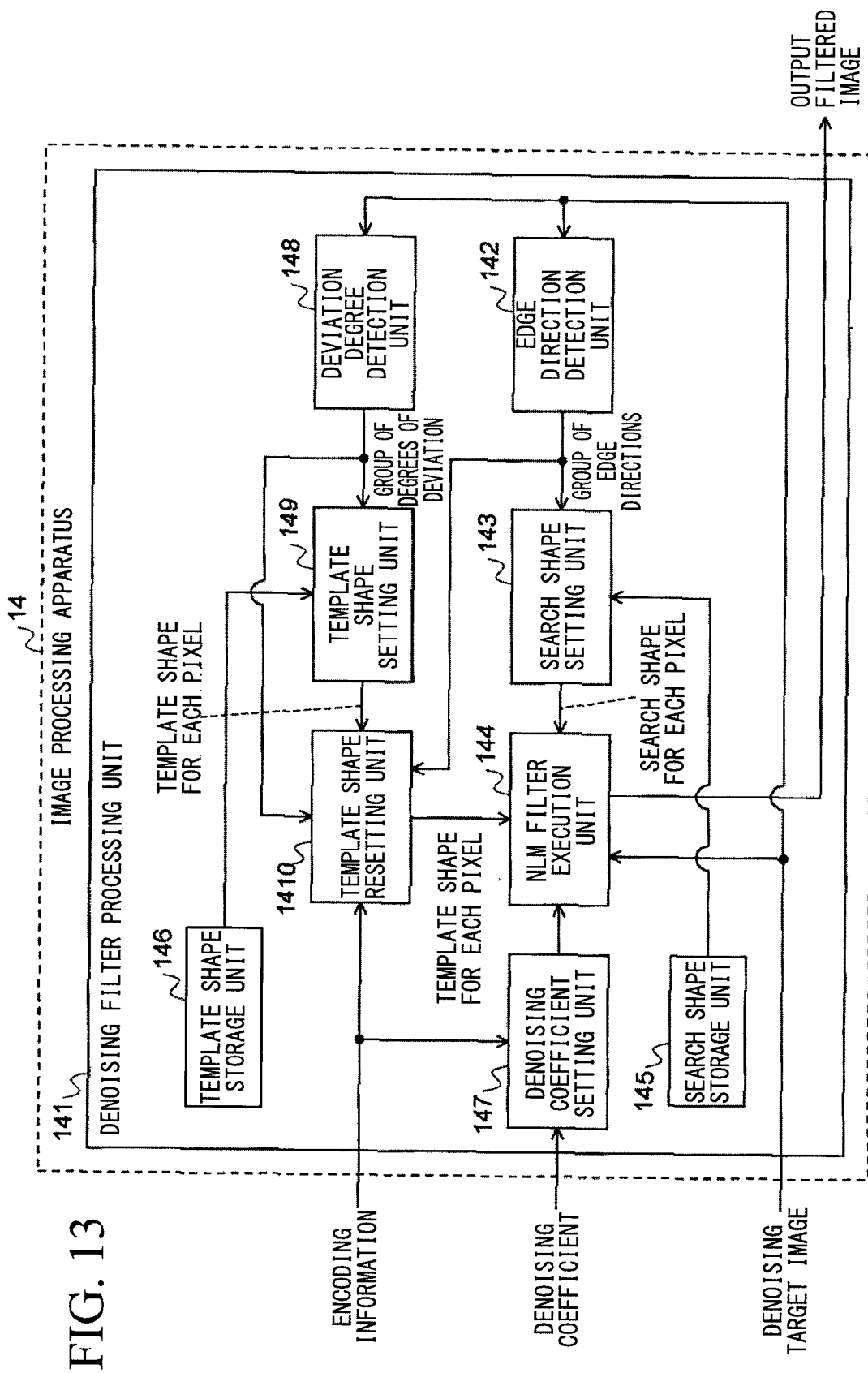
FIG. 13 is a diagram illustrating an example of a configuration of an image processing apparatus in accordance with a sixth embodiment of the present invention.

FIG. 13 is a diagram illustrating an example of a configuration of an image processing apparatus in accordance with a sixth embodiment of the present invention. An image processing apparatus 14 is provided with a denoising filter processing unit 141 which includes an edge direction detection unit 142, a search shape setting unit 143, an NLM filter execution unit 144, a search shape storage unit 145, a template shape storage unit 146, a denoising coefficient setting unit 147, a deviation degree detection unit 148, a template shape setting unit 149, and a template shape resetting unit 1410.

This image processing apparatus 14 is different from the image processing apparatus 13 in the fifth embodiment in that the template shape resetting unit 1410 is provided. The template shape resetting unit 1410 performs resetting for further limiting a template shape that has been excessively allocated by the template shape setting unit 149 with reference to a group of edge directions, a group of degrees of deviation, and encoding information. Specifically, a template shape that is prone to be excessively allocated to the surroundings of block noise, which is prone to be generated at unit boundaries of PredictionUnit and TransformUnit, is further limited.

Figure 14:
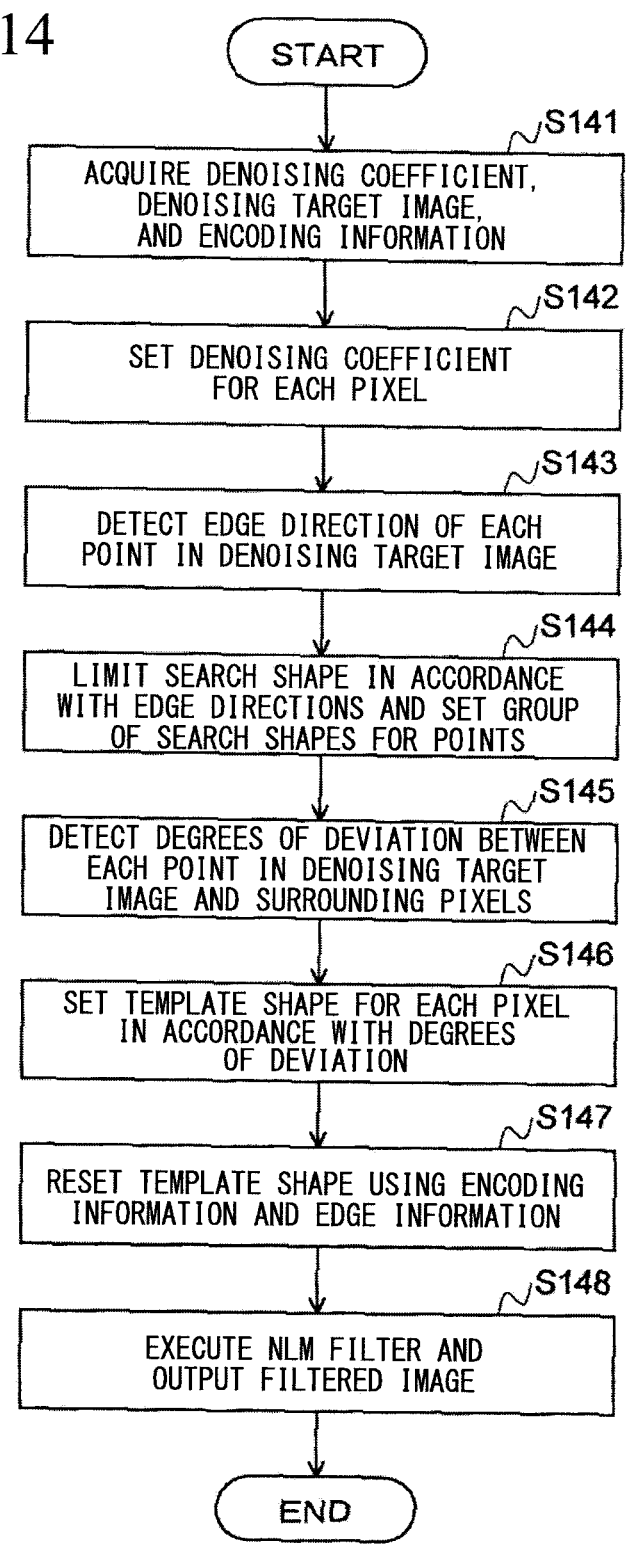
FIG. 14 is a flowchart of the processing of the image processing apparatus of the sixth embodiment.

FIG. 14 is a flowchart of the processing of the image processing apparatus 14 shown in FIG. 13. The processes from step S141 to step S146 are the same as those from step S131 to step S136 described with reference to FIG. 11. In step S147, the template shape resetting unit 1410 resets a template shape using encoding information and edge information to reduce an excessive allocation of the template shape set in step S146. Finally, in step S148, the NLM filter execution unit 144 executes an NLM filter in accordance with the set information and outputs a resultant filtered image.

[Example of Deviation Degree Detection Method]

An example of the deviation degree detection methods in the deviation degree detection units 138 and 148 will be described. FIG. 15A to FIG. 15B are diagrams describing the example of the deviation degree detection methods. A description will be given for a case in which a pixel z shown in FIG. 15A is set as a denoising target pixel and numbers a to x are assigned to its surrounding pixels. Here, the weighted sum obtained by multiplying the absolute differences between the pixel z and the surrounding pixels (a to x) by coefficients that take attenuation depending on distance into consideration is used as an index for the degree of deviation (DiffIntensity). That is, DiffIntensity is calculated by the following equation.

$$DiffIntensity = A(|h-z|+|l-z|+|m-z|+|q-z|) +$$
$$B(|g-z|+|i-z|+|p-z|+|r-z|) +$$
$$C(|c-z|+|k-z|+|n-z|+|v-z|) +$$
$$D(|b-z|+|d-z|+|f-z|+|j-z|+|o-z|+|s-z| +$$
$$|u-z|+|w-z|) +$$
$$E(|a-z|+|e-z|+|t-z|+|x-z|)$$

A to E in the equation are coefficients determined in advance in accordance with the distances between the target pixel and the surrounding pixels, and they are set arbitrarily. For example, a Gaussian distribution depending on distance and so on can be applied to the setting of these coefficients A to E. It is to be noted that not all of A to E are necessarily targets, and it is possible to reduce the computational complexity of the filter by, for example, setting D to 0.

Upon completion of calculation for all DiffIntensities, the deviation degree detection units 138 and 148 output a group of degrees of deviation to the subordinate template shape setting units 139 and 149.

Alternatively, it is contemplated that the absolute value of a Laplacean filter, a sum of squared difference (SSD), a variance, and so on can be applied to the calculation of the degrees of deviation.

In order to further reduce the computational complexity, a technique of setting several sampling points as calculation targets for each N×N block having an arbitrary size for a decoded image and using the degrees of deviation as typical values at pixel positions thereof is also contemplated.

FIG. 15B illustrates an example of thinning out the number of samples. In this example, a block is divided into 2×2, and the upper left pixel and the lower right pixel are calculation targets. When the degree of deviation in this example is denoted as $DiffIntensity_{2\times2}$, $DiffIntensity_{2\times2}$ is calculated by the following equation.

$$DiffIntensity_{2\times2} = (DiffIntensity \text{ at pixel position of } A + DiffIntensity \text{ at pixel position of } D)/2$$

The above $DiffIntensity_{2\times2}$ is used as a typical value when reference to the degrees of deviation at the pixel positions of A to D is requested. In this example, the computational complexity required for calculating the degrees of deviation is reduced to approximately half.

[Example 1 of Template Shape Setting Method]

As one of examples of the template shape setting methods in the template shape setting units 139 and 149, an example of a reduction in template shape for all the points of a reference template shape of a 3×3 block that is given from an apparatus using a group of degrees of deviation calculated by the deviation degree detection units 138 and 148 will be given.

FIG. 16 is a diagram illustrating a histogram of degrees of deviation as well as the relationship between thresholds and the setting of regions. When the target is a nature image, the histogram of the group of degrees of deviation is skewed to a lower value, and the higher the degree of deviation is, the smaller the frequency of appearances is. Moreover, the histogram has a property that it is skewed to a lower degree of deviation as the value of a quantization parameter becomes larger.

The template shape setting units 139 and 149 create a histogram of an input group of degrees of deviation, divide the histogram into four so that the ratios between areas thereof are equal to each other, and set template shapes $Tmp_{Shape}$ for regions α to δ as follows. The value of a boundary between the regions α and β is denoted as Thα, the value of a boundary between the regions β and γ is denoted as Thβ, and the value of a boundary between the regions γ and δ is denoted as Thγ.

(1) If the degree of deviation is smaller than the threshold Thα, $Tmp_{Shape}$=None (the number of elements is 0).

When $Tmp_{Shape}$ is None, template matching is not performed.

(2) If the degree of deviation is larger than or equal to the threshold Thα and smaller than Thβ, $Tmp_{Shape}$=Point (the number of elements is 1).

When $Tmp_{Shape}$ is Point, only SSD for a target pixel and a pixel of a search point is calculated.

(3) If the degree of deviation is larger than or equal to the threshold Thβ and smaller than Thγ, $Tmp_{Shape}$=Cross (the number of elements is 5).

When $Tmp_{Shape}$ is Cross, matching is performed using a template shape of five pixels including the target pixel and four (top, bottom, left, and right) pixels.

(4) If the degree of deviation is larger than or equal to the threshold Thγ, $Tmp_{Shape}$=$Block_{3\times3}$ (the number of elements is 9).

When $Tmp_{Shape}$ is $Block_{3\times3}$, matching is performed for all the points of a template shape of a 3×3 block.

Compared to a technique of performing matching for all the points of a template shape of a 3×3 block and for all the search points, the following computational complexities are obtained by introducing the present technique.

Region α: computational complexity 0
Region β: computational complexity 1/9
Region γ: computational complexity 5/9
Region δ: computational complexity 1

Since each region occupies 1/4 of the entire frame, the total computational complexity is 5/12, and the theoretical value of the computational complexity can be reduced to approximately a little less than 1/2.

The following is the reason why the template shape is determined in accordance with the size of the degree of deviation in this manner. A signal having a high degree of deviation tends to appear in the surroundings of a strong edge, and then a weak edge, mosquito noise due to DCT, noise at the time of taking an image, and so on appear as a signal having a low degree of deviation to a medium degree of deviation. Since an NLM filter has a property that it is effective particularly in the surroundings of an edge, the present embodiment allocates a large template shape to a region (region δ) where the degree of deviation is high, thereby suppressing a deterioration in the denoising effect.

[Example 2 of Template Shape Setting Method]

As another example of the template shape setting methods in the template shape setting units 139 and 149, an example of a reduction in template shape for all the points of a reference template shape of an N×N block that is given from an apparatus using a group of degrees of deviation calculated by the deviation degree detection units 138 and 148 will be given.

Figure 17A:
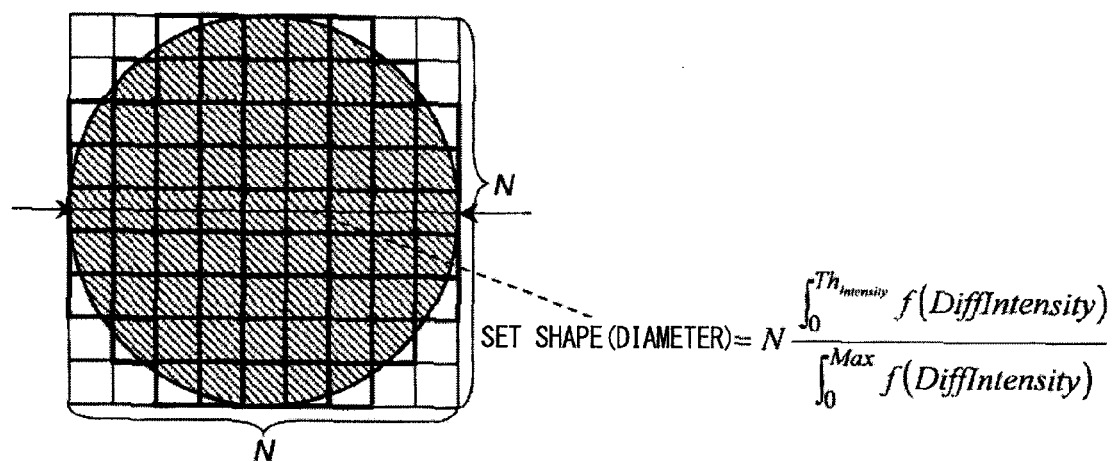
FIG. 17A is a diagram describing an example of the setting of the number of samples in accordance with the ratio of integration.
Figure 17B:
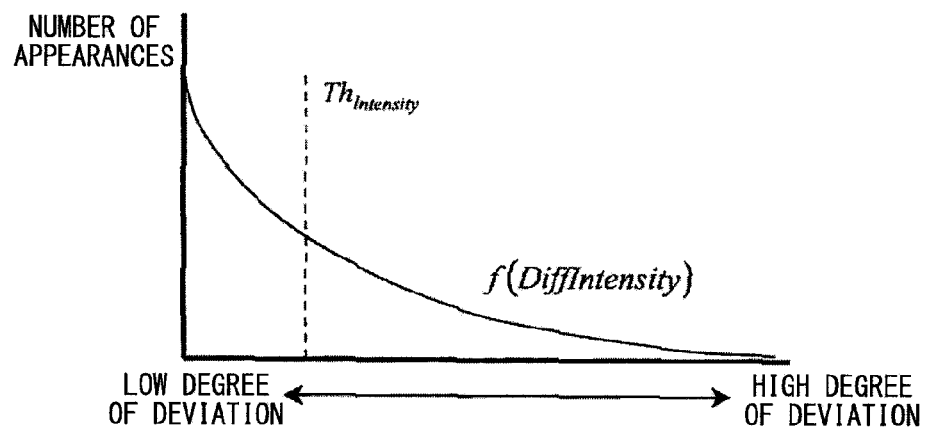
FIG. 17B is a diagram describing the example of the setting of the number of samples in accordance with the ratio of integration.

FIG. 17A to FIG. 17B are diagrams describing an example of the setting of the number of samples in accordance with the ratio of integration. The template shape setting units 139 and 149 create a histogram of the group of degrees of deviation, and set a template shape using the ratio between integrated values of a function f(DiffIntensity) (FIG. 17B) representing the distribution of the degrees of deviation, where the degree of deviation of a denoising target pixel on the histogram is denoted as $Th_{Intensity}$.

That is, when the reference template shape is given as an N×N block as shown in FIG. 17A, the reduced template shape is set to a circle and its diameter is determined as follows.

Set shape (diameter)=N×[{integrated value of f(DiffIntensity) from 0 to $Th_{Intensity}$}/{integrated value of f(DiffIntensity) from 0 to maximum value Max}]

Accordingly, it is possible to perform effective template matching by using a small template shape when the degree of deviation is low and using a large template shape when the degree of deviation is high.

[Example of Template Shape Resetting Method]

As one of examples of the template shape resetting method in the template shape resetting unit 1410, an example in which the template shape set by the template shape setting unit 149 shown in FIG. 16 is reset using the group of degrees of deviation output by the deviation degree detection unit 148 shown in FIG. 15B, the group of edge directions shown in FIG. 7B to FIG. 7C, and encoding information, to further reduce the size of the template shape will be described.

Figures 18A, 18B, 18C:
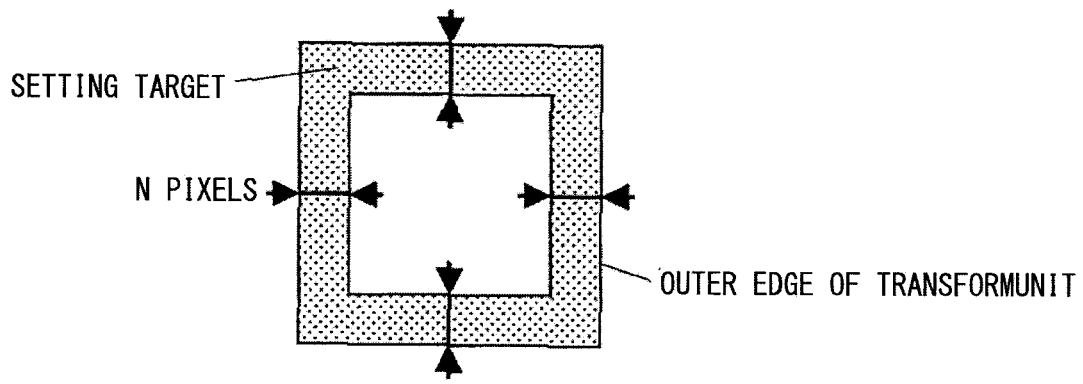
FIG. 18A is a diagram describing a calculation target region in an example of a template shape resetting method.
FIG. 18B is a diagram describing a feature of block noise in the example of the template shape resetting method.
FIG. 18C is a diagram describing the setting of four corners in the example of the template shape resetting method.

FIG. 18A to FIG. 18C are diagrams describing a template shape resetting method. First, a unit size of TransformUnit, which is a unit of a transform process such as DCT, is acquired from the encoding information, and N pixels in the vicinity of an outer edge of each unit is set as a setting target region as shown in FIG. 18A. With respect to the other regions, the setting result of the above-described template shape setting unit 149 is used without modification.

When a group of edge directions is used, as shown in FIG. 18B, VecIndices tend to be skewed to 1 at the top and bottom portions of the outer edge of the unit where there is noticeable block noise, VecIndices tend to be skewed to 6 at the left and right portions of the outer edge of the unit, and high degrees of deviation are detected at these boundary portions. Moreover, in a large quantization parameter region where noticeable block noise appears, a relatively flat region tends to appear inside TransformUnit.

That is, in a medium rate region to a low rate region where a quantization parameter QP is large, if the feature as shown in FIG. 18B is satisfied in the setting target region in FIG. 18A, there is a high possibility that block noise is generated. With respect to pixel positions at block boundaries where VecIndices are skewed to 1 or 6, the calculation result using a large template shape is almost the same as that using a small template shape. However, a large template shape is set if a sharp edge is detected at a block boundary, which results in inefficiency. Therefore, the template shape resetting unit 1410 revises the template shape to solve the problem of inefficiency.

As a specific solving technique, for example, the following technique is conceivable. The following setting is performed on each pixel position using predetermined thresholds $Th1_{QP}$ and $Th2_{QP}$ (where $Th1_{QP}<Th2_{QP}$) for the quantization parameter QP and predetermined thresholds $Th1_{Diff}$ and $Th2_{Diff}$ (where $Th1_{Diff}<Th2_{Diff}$) for the degree of deviation DiffIntensity. By doing so, it is possible to reduce the computational complexity while suppressing a deterioration in the denoising effect. It is to be noted that it is assumed that $Th1_{Diff}$ and $Th2_{Diff}$ vary in accordance with the quantization parameter QP.

If the following condition is satisfied, a template shape $Tmp_{Shape}$ is set in accordance with a resetting branch algorithm described below.

[Condition 1]: VecIndices at target pixel positions in pixel positions in the setting target region of the top and bottom portions of the outer edge of the unit are 1 (a horizontal edge) or 0 (a flat region), and VecIndices at adjacent pixel positions inside the unit are 0 (a flat region).

[Condition 2]: Or, VecIndices at target pixel positions in pixel positions in the setting target region of the left and right portions of the outer edge of the unit are 6 (a vertical edge) or 0 (a flat region), and VecIndices at the adjacent pixel positions inside the unit is 0 (a flat region).

Example of "Resetting Branch Algorithm"

(1) If quantization parameter QP>threshold $Th2_{QP}$, template shape $Tmp_{Shape}$ is $Block_{3\times3}$ or Cross, and degree of deviation DiffIntensity>threshold $Th1_{Diff}$, $Tmp_{Shape}$ is reset to Point (the number of elements is 1).

(2) If the above condition is not satisfied, quantization parameter QP>threshold $Th1_{QP}$, template shape $Tmp_{Shape}$ is Block$_{x3}$, and degree of deviation DiffIntensity>threshold Th2$_{Diff}$, Tmp$_{Shape}$ is reset to Point (the number of elements is 1).

(3) If the above conditions are not satisfied, quantization parameter QP>threshold Th1$_{QP}$, template shape Tmp$_{Shape}$ is Block$_{3\times3}$, and degree of deviation DiffIntensity>threshold Th1$_{Diff}$, Tmp$_{Shape}$ is reset to Cross (the number of elements is 5).

(4) If the above conditions are not satisfied, quantization parameter QP>threshold Th1$_{QP}$, template shape Tmp$_{Shape}$ is Cross, and degree of deviation DiffIntensity>Th1$_{Diff}$, Tmp$_{Shape}$ is reset to Point (the number of elements is 1).

(5) If the above conditions (1) to (4) are not satisfied, the processing is completed without resetting Tmp$_{Shape}$.

Since VecIndices generated by block noise cannot be predicted for regions E, F, G, and H at four corners in FIG. 18C, the template shape is reset for all the pixel positions within the regions using the above-described resetting branches (1) to (5), if the following conditions are satisfied.

Region E: there is a pixel that satisfies the above conditions among a group of pixels of a region A, which is adjacent to the right thereof, and a group of pixels of a region C, which is adjacent to the below thereof.

Region F: there is a pixel that satisfies the above conditions among the group of pixels of the region A, which is adjacent to the left thereof, and a group of pixels of a region D, which is adjacent to the below thereof.

Region G: there is a pixel that satisfies the above conditions among a group of pixels of a region B, which is adjacent to the right thereof, and the group of pixels of the region C, which is adjacent to the above thereof.

Region H: there is a pixel that satisfies the above conditions among the group of pixels of the region B, which is adjacent to the left thereof, and the group of pixels of the region D, which is adjacent to the above thereof.

The present embodiment demonstrates an example in which the computational complexity is reduced for a group of pixels at block boundaries; to the contrary, an implementation in which Tmp$_{Shape}$ is set to None for the entire group of pixels inside a block, template matching is not performed on that portion, and a denoising filter is applied to only block boundaries to thereby greatly reduce the computational complexity is also possible.

It is to be noted that the fifth embodiment and the sixth embodiment describe examples in which the denoising filter processing units 131 and 141 retain a reference search shape and a reference template shape as fixed values, but an implementation which supplies one or both of them from the outside is also possible.

[Example of Application to Video Encoding Apparatus]

Figure 19:
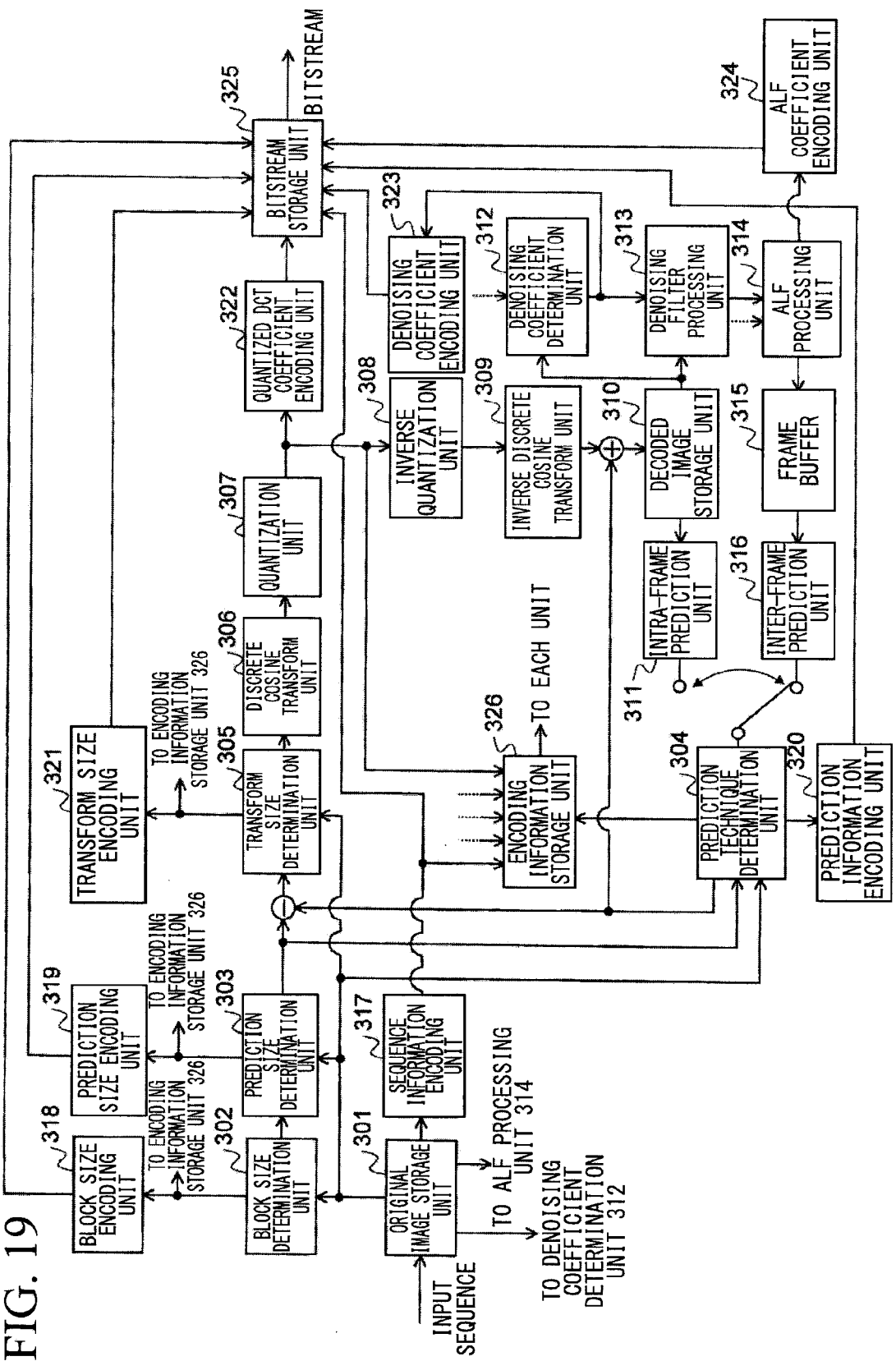
FIG. 19 is a diagram illustrating an example of a configuration of a video encoding apparatus to which an embodiment of the present invention is applied.

FIG. 19 is a diagram illustrating an example of a configuration of a video encoding apparatus to which an embodiment of the present invention is applied. The denoising filter processing units 101 to 141 described as the first embodiment to the sixth embodiment can be used as a denoising filter processing unit 313, which is a loop filter in the video encoding apparatus shown in FIG. 19. Therefore, it is possible to increase the coding efficiency compared to a case in which a conventional common deblocking filter is used. Moreover, it is possible to greatly reduce the computational complexity for denoising a decoded image compared to a case in which a conventional NLM filter is used without modification. It is to be noted that FIG. 19 illustrates an example in which the denoising filter processing units 131 and 141 retain both a reference search shape and a reference template shape as fixed values. Moreover, an example in which as the denoising coefficient, a denoising coefficient that provides the optimum coding efficiency compared to that of an original image is determined, which is encoded in a bitstream as a denoising-coefficient overhead is illustrated. When one or both of a search shape and a template shape is supplied from the outside through, for example, the user's setting, it is necessary to transmit these shapes to a decoding apparatus, but the setting from the outside can be realized by encoding these shapes as an overhead similar to the denoising coefficient, and thus a description thereof is omitted in the example of application to the present encoding apparatus and in an example of application to a decoding apparatus.

Hereinafter, the video encoding apparatus shown in FIG. 19 will be described. An original image storage unit 301 is a storage unit for all the images of an input sequence, which is an encoding target, and sequentially outputs encoding target images of frames.

A block size determination unit 302 determines a block size, with which a predetermined CodingUnit is divided and encoding is executed, and outputs a target block and the block size. A prediction size determination unit 303 determines a block prediction size, with which pixel values of the target block are predicted, and outputs a target block and the prediction size. A prediction technique determination unit 304 determines a technique that provides the highest coding efficiency among techniques including intra-frame prediction and inter-frame prediction when the pixel values of the target block are predicted, and outputs a prediction block and prediction information when that technique is used. The difference between the target block output by the prediction size determination unit 303 and the prediction block is calculated to generate a difference block.

A transform size determination unit 305 determines a transform size, with which the difference block is divided, and outputs divided difference blocks having the transform size as well as the transform size. A discrete cosine transform unit 306 applies a discrete cosine transform to the difference blocks and outputs DCT coefficients. A quantization unit 307 quantizes the DCT coefficients and outputs quantized DCT coefficients.

An inverse quantization unit 308 performs inverse quantization on the quantized DCT coefficients to restore the DCT coefficients. An inverse discrete cosine transform unit 309 applies an inverse discrete cosine transform to the DCT coefficients and outputs a decoded difference block. The decoded difference block is added to the prediction block to generate a partial decoded image. A decoded image storage unit 310 is a storage unit for storing the partial decoded image and images that can also be referred to in the decoding apparatus. An intra-frame prediction unit 311 refers to the partial decoded image stored in the decoded image storage unit 310 and outputs a prediction block and prediction information.

A denoising coefficient determination unit 312 determines a denoising coefficient that provides the optimum coding efficiency with reference to a decoded image and the original image, and outputs the denoising coefficient. The denoising filter processing unit 313 performs a filter process for reducing coding distortion described in the above-described first to sixth embodiments and so on with reference to the decoded image to generate a filtered decoded image.

An adaptive loop filter (ALF) processing unit 314 performs a filter process on the filtered decoded image so as to be close to the original image, and outputs an ALF-ed decoded image and ALF coefficients. A frame buffer 315 is a storage unit for storing the ALF-ed decoded image. An inter-frame prediction unit 316 refers to the frame buffer 315 and outputs a prediction block and prediction information.

A sequence information encoding unit 317 encodes information unique to the input sequence, such as the numbers of pixels in the vertical direction and the horizontal direction of video, and then outputs a sequence-information overhead to a bitstream storage unit 325. A block size encoding unit 318 receives the block size from the block size determination unit 302, performs encoding, and then outputs a block-size overhead. A prediction size encoding unit 319 receives the prediction size from the prediction size determination unit 303, performs encoding, and then outputs a prediction-size overhead. A prediction information encoding unit 320 receives the prediction information from the prediction technique determination unit 304, performs encoding, and then outputs a prediction-information overhead.

A transform size encoding unit 321 receives the transform size from the transform size determination unit 305, performs encoding, and then outputs a transform-size overhead. A quantized DCT coefficient encoding unit 322 receives the quantized DCT coefficients from the quantization unit 307, performs encoding, and then outputs a DCT overhead. A denoising coefficient encoding unit 323 receives the denoising coefficient determined by the denoising coefficient determination unit 312, performs encoding, and then outputs a denoising-coefficient overhead. An ALF coefficient encoding unit 324 receives the ALF coefficients, performs encoding, and then outputs an ALF overhead. The bitstream storage unit 325 is a storage unit for storing each overhead, and outputs a bitstream as an encoding result upon completion of encoding of the entire sequence.

An encoding information storage unit 326 is a storage unit for storing encoding information which can also be referred to in the decoding apparatus. This encoding information stored in the encoding information storage unit 326 is referred to and used by the denoising filter processing unit 313 and other units.

[Processing Flow of Video Encoding Apparatus]

Figure 20:
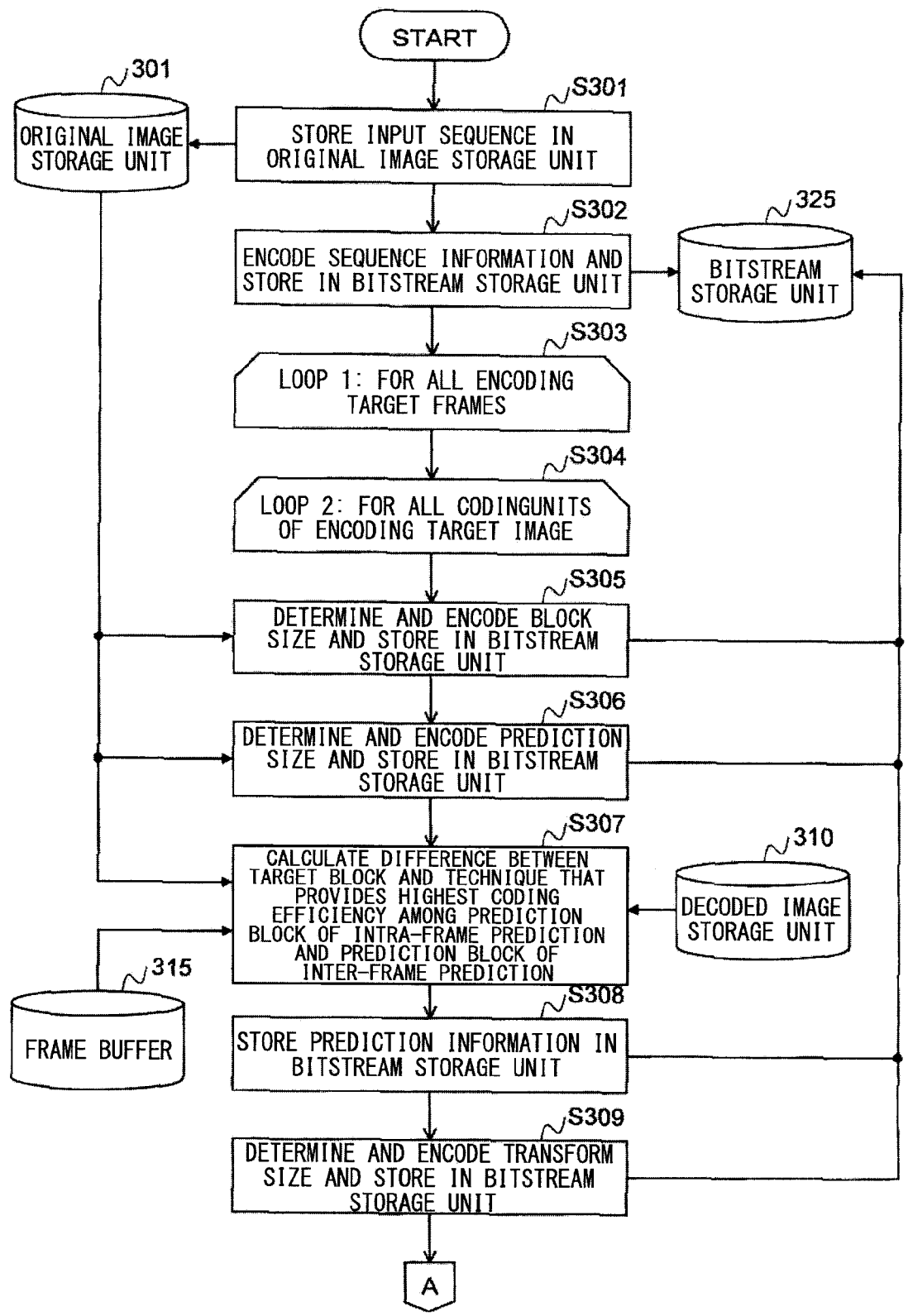
FIG. 20 is a flowchart of the processing of the video encoding apparatus.
Figure 21:
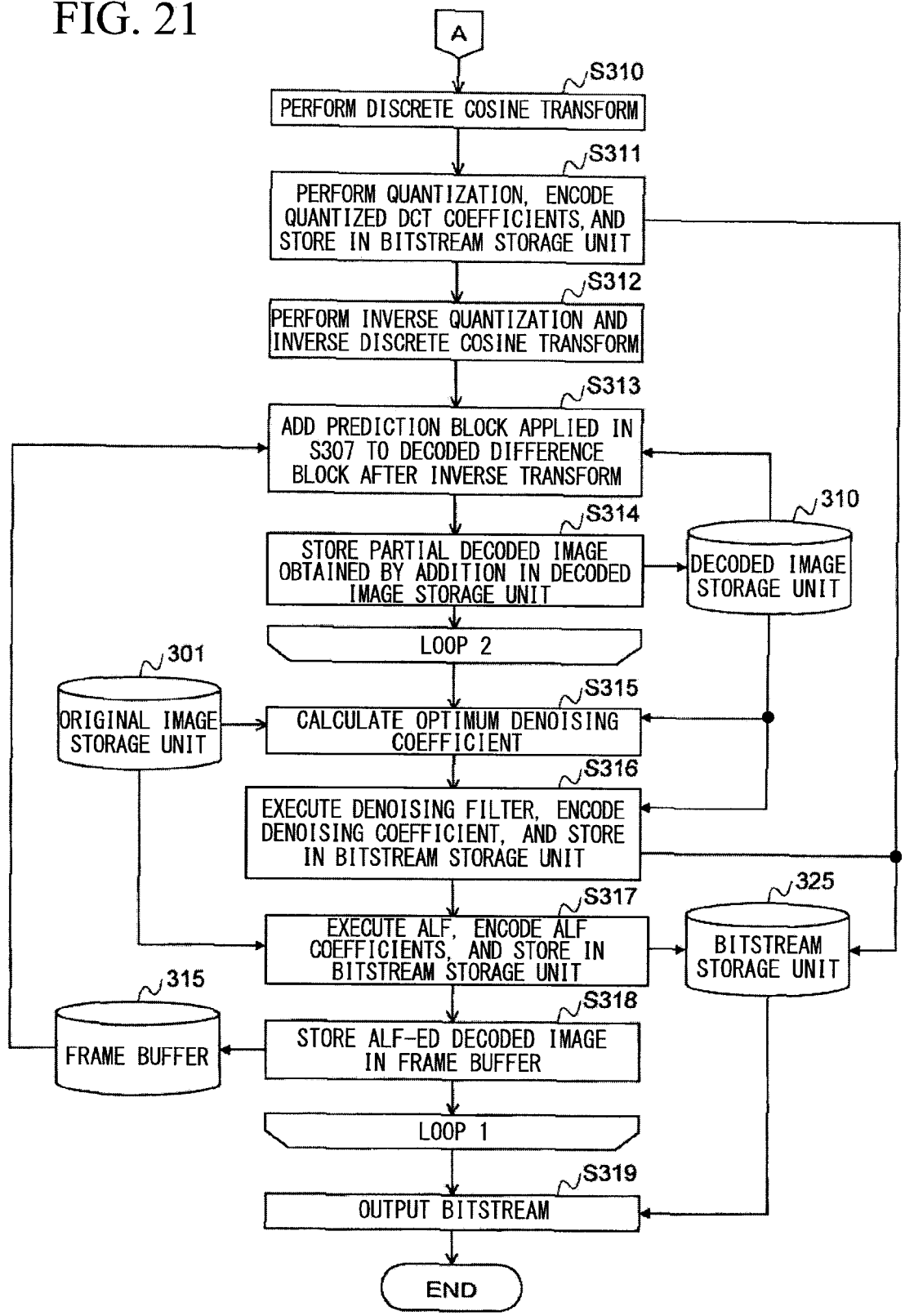
FIG. 21 is a flowchart of the processing of the video encoding apparatus.

FIG. 20 and FIG. 21 illustrate a flowchart of the processing of the video encoding apparatus shown in FIG. 19. The video encoding apparatus performs the following processes.

First, in step S301, an input sequence is stored in the original image storage unit 301.

Next, in step S302, sequence information is encoded and stored in the bitstream storage unit 325.

Next, in step S303, a loop process up to step S318 is performed on all the encoding target frames.

Next, in step S304, a loop process up to step S314 is performed on all CodingUnits (CUs) of an encoding target image.

Next, in step S305, a block size is determined, encoded, and stored in the bitstream storage unit 325.

Next, in step S306, a prediction size is determined, encoded, and stored in the bitstream storage unit 325.

Next, in step S307, the difference between a target block and a technique that provides the highest coding efficiency among a prediction block of intra-frame prediction and a prediction block of inter-frame prediction is calculated.

Next, in step S308, prediction information is stored in the bitstream storage unit 325.

Next, in step S309, a transform size is determined, encoded, and stored in the bitstream storage unit 325.

Next, in step S310, a discrete cosine transform (DCT) is performed.

Next, in step S311, quantization is performed, and quantized DCT coefficients are encoded and stored in the bitstream storage unit 325.

Next, in step S312, inverse quantization and an inverse discrete cosine transform are performed.

Next, in step S313, the prediction block applied in step S307 is added to a decoded difference block after the inverse transform.

Next, in step S314, a partial decoded image obtained by the addition is stored in the decoded image storage unit 310.

Upon completion of the loop process for all CUs of the encoding target image, in step S315, a denoising coefficient that provides the optimum coding efficiency is calculated using the decoded image and the original image.

Next, in step S316, a denoising filter process using the present technique is executed on the decoded image using the calculated denoising coefficient, and the denoising coefficient is encoded and stored in the bitstream storage unit 325.

Next, in step S317, an adaptive loop filter (ALF) is executed, and ALF coefficients are encoded and stored in the bitstream storage unit 325.

Next, in step S318, an ALF-ed decoded image is stored in the frame buffer 315.

Upon completion of the loop process for all the encoding target frames, in step S319, a bitstream is output and the processing is completed.

[Example of Application to Video Decoding Apparatus]

Figure 22:
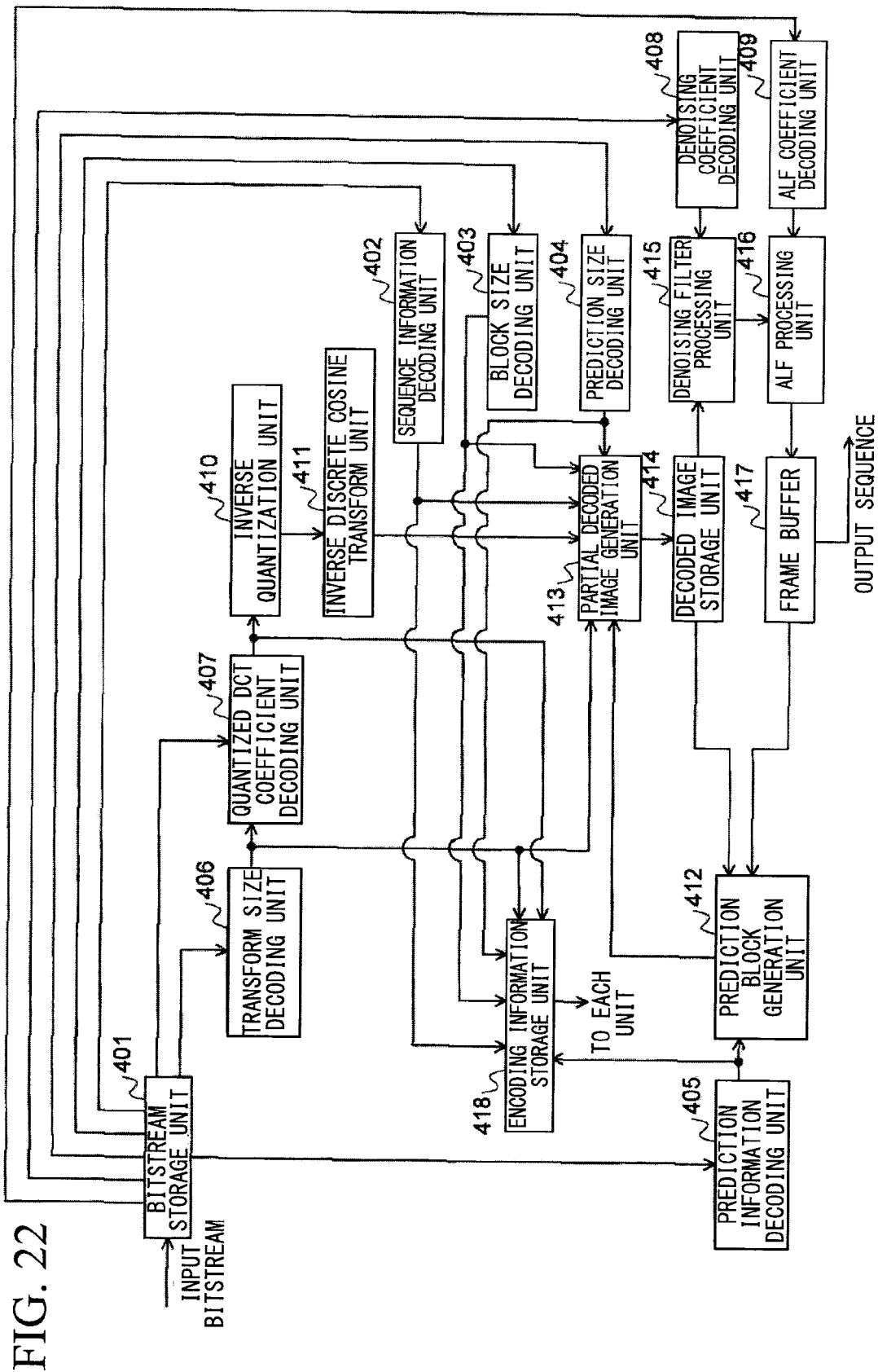
FIG. 22 is a diagram illustrating an example of a configuration of a video decoding apparatus to which an embodiment of the present invention is applied.

FIG. 22 is a diagram illustrating an example of a configuration of a video decoding apparatus to which an embodiment of the present invention is applied. The denoising filter processing units 101 to 141 described as the first to sixth embodiments can be used as a denoising filter processing unit 415, which is a loop filter in the video decoding apparatus shown in FIG. 22. Therefore, it is possible to greatly reduce the computational complexity compared to a case in which a conventional NLM filter is used without modification.

Hereinafter, the video decoding apparatus shown in FIG. 22 will be described. A bitstream storage unit 401 is a storage unit for an input bitstream, and outputs each piece of overhead information as need arises. A sequence information decoding unit 402 receives the sequence-information overhead, and decodes information unique to a sequence such as the numbers of pixels in the vertical direction and the horizontal direction of video.

A block size decoding unit 403 receives the block-size overhead, and decodes information indicating a block size, with which a predetermined CodingUnit is divided and encoded. A prediction size decoding unit 404 receives the prediction-size overhead and outputs a prediction size applied in the video encoding apparatus.

A prediction information decoding unit 405 receives the prediction-information overhead and outputs prediction information. A transform size decoding unit 406 receives the transform-size overhead and outputs a transform size applied in the video encoding apparatus. A quantized DCT coefficient decoding unit 407 receives the transform size and the DCT overhead and outputs quantized DCT coefficients. A denoising coefficient encoding unit 408 receives the denoising-coefficient overhead and outputs a denoising coefficient. An ALF coefficient decoding unit 409 receives the ALF overhead and outputs ALF coefficients.

An inverse quantization unit 410 performs inverse quantization on the quantized DCT coefficients to restore the DCT coefficients. An inverse discrete cosine transform unit 411 applies an inverse discrete cosine transform to the DCT coefficients and outputs a decoded difference signal. A prediction block generation unit 412 receives the prediction information, a partial decoded image, and a reference frame, and generates a prediction block. A partial decoded image generation unit 413 adds the prediction block to the decoded difference signal to generate the partial decoded image. A decoded image storage unit 414 is a storage unit for storing the partial decoded image.

The denoising filter processing unit 415 performs a filter process for reducing coding distortion described in the above-described first to sixth embodiments and so on with reference to the decoded image to generate a filtered decoded image.

An ALF processing unit 416 receives the ALF coefficients, performs a filter process on the filtered decoded image so as to be close to the original image, and outputs an ALF-ed decoded image. It is to be noted that this ALF-ed decoded image becomes a final decoded image in the decoding. A frame buffer 417 is a storage unit for storing the ALF-ed decoded image. An encoding information storage unit 418 is a storage unit for storing encoding information, and this encoding information stored in the encoding information storage unit 418 is referred to and used by the denoising filter processing unit 415 and other units.

[Processing Flow of Video Decoding Apparatus]

Figure 23:
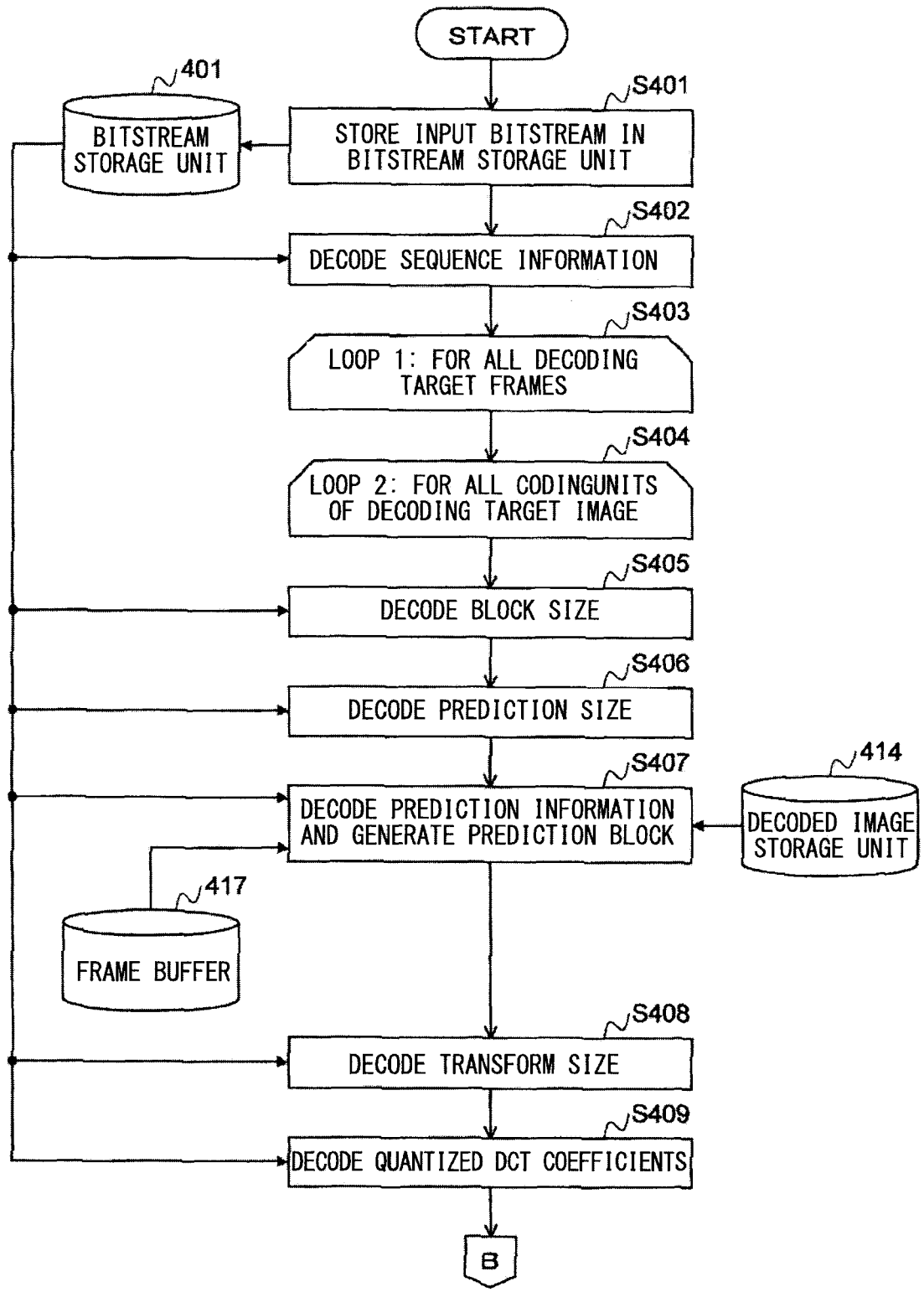
FIG. 23 is a flowchart of the processing of the video decoding apparatus.
Figure 24:
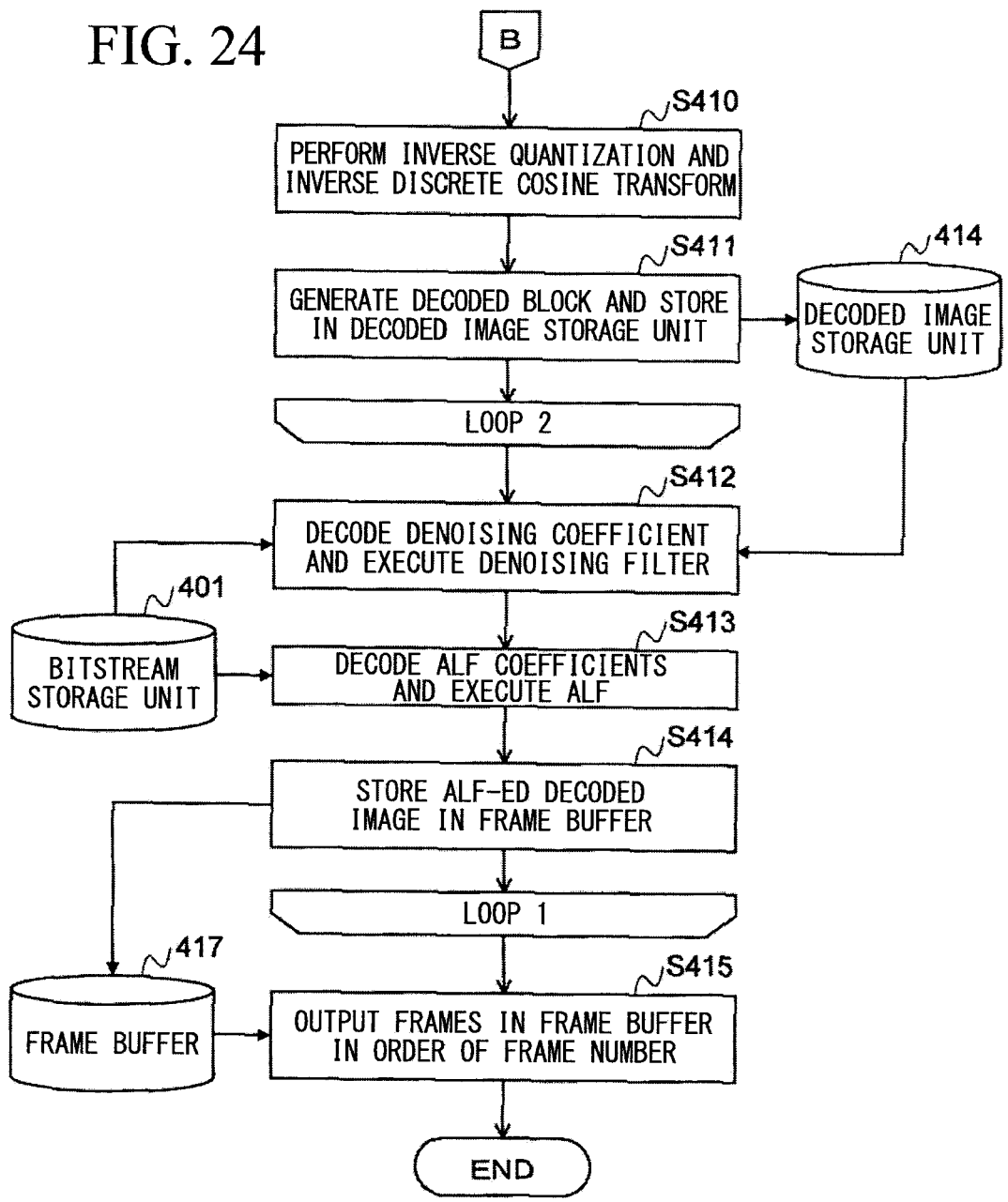
FIG. 24 is a flowchart of the processing of the video decoding apparatus.

FIG. 23 and FIG. 24 illustrate a flowchart of the processing of the video decoding apparatus shown in FIG. 22. The video decoding apparatus performs the following processes.

First, in step S401, an input bitstream is stored in the bitstream storage unit 401.

Next, in step S402, sequence information is decoded.

Next, in step S403, a loop process up to step S414 is performed on all the decoding target frames.

Next, in step S404, a loop process up to step S411 is performed on all CodingUnits (CUs) of a decoding target image.

Next, in step S405, a block size is decoded.

Next, in step S406, a prediction size is decoded.

Next, in step S407, prediction information is decoded and a prediction block is generated.

Next, in step S408, a transform size is decoded.

Next, in step S409, quantized DCT coefficients are decoded.

Next, in step S410, inverse quantization and an inverse discrete cosine transform are performed.

Next, in step S411, a decoded block is generated using the prediction block of step S407 and the result of step S410 and is stored in the decoded image storage unit 414.

Upon completion of the loop process for all CUs of the decoding target image, in step S412, a denoising coefficient is decoded, and a denoising filter process using the present technique is executed on a partial decoded image.

Next, in step S413, ALF coefficients are decoded, and an ALF process is executed.

Next, in step S414, an ALF-ed decoded image is stored in the frame buffer 417.

Upon completion of the loop process for all the decoding target frames, in step S415, frames of the frame buffer 417 are output in the order of frame number to generate an output sequence, and the processing is completed.

[Effect of Reduction in Computational Complexity]

It was confirmed that when a denoising filter in accordance with the present technique is applied to encoding of standard video, it is possible to reduce the computational complexity required for the above filter by approximately 50 to 75% while suppressing a deterioration in PSNR, compared to a technique which incorporates a conventional NLM filter (a denoising filter in accordance with the non-local means method) into the next-generation video coding standards.

[Example of Configuration when Software Program is Used]

The processes of the above image processing, video encoding, and video decoding can also be realized by a computer and a software program, the program can be recorded on a computer-readable recording medium, and the program can be provided through a network.

Figure 25:
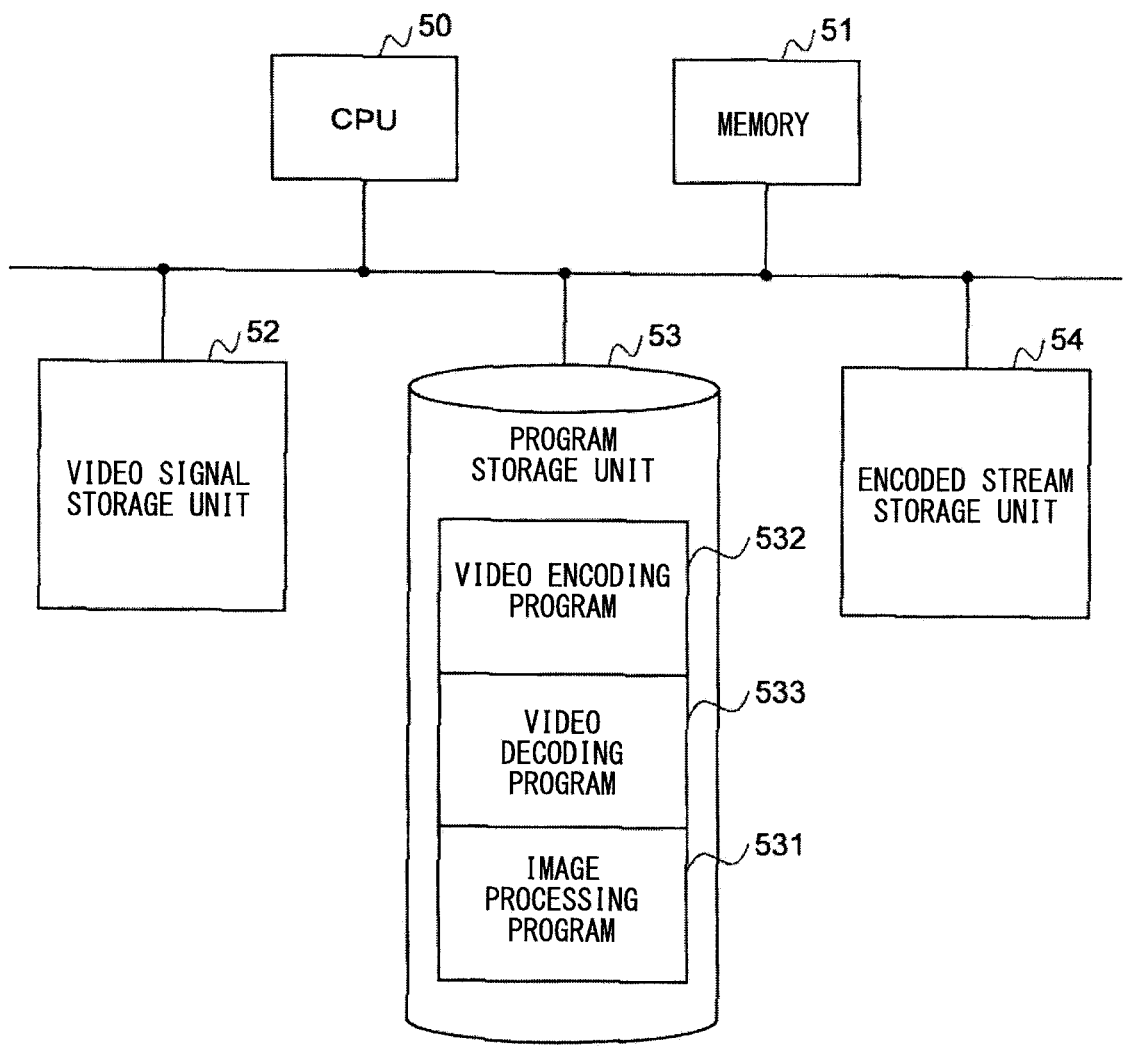
FIG. 25 is a diagram illustrating an example of a configuration of a system when an embodiment of the present invention is implemented using a software program.
Figure 26:
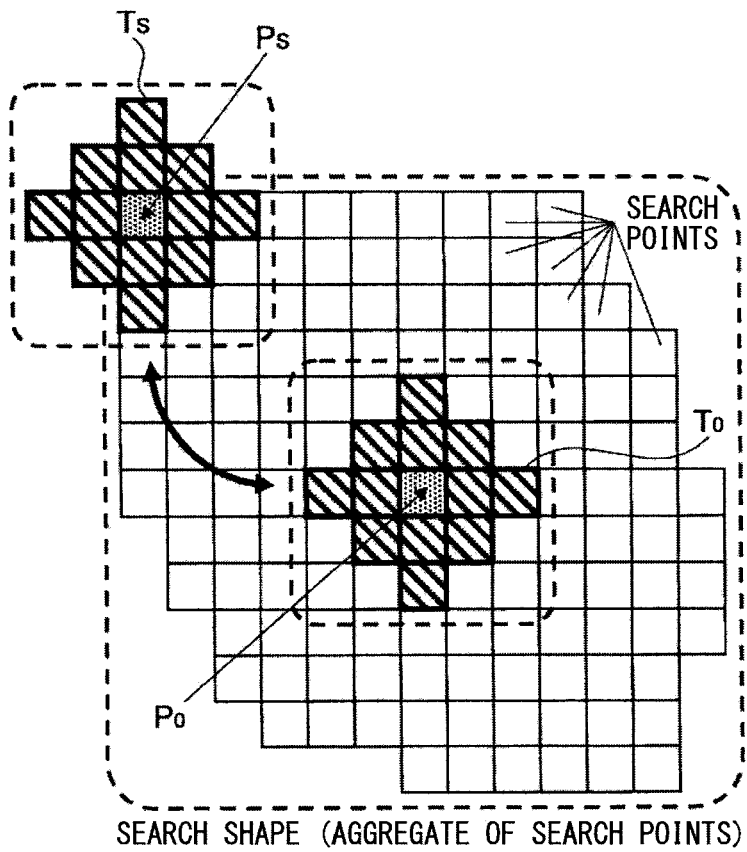
FIG. 26 is a diagram describing an NLM filter.

FIG. 25 illustrates an example of a configuration of a system when an embodiment of the present invention is implemented using a computer and a software program.

The present system is configured such that a central processing unit (CPU) 50 which executes a program, a memory 51, such as a random access memory (RAM), which stores the program and data accessed by the CPU 50, a video signal storage unit 52 which stores denoising target image signals, an encoding target video signal, or a video signal of decoded images, a program storage unit 53 which stores the program for making the CPU 50 execute the processes described in the embodiments of the present invention, and an encoded stream storage unit 54 which stores a bitstream as an encoding result or a decoding target bitstream are connected to each other through a bus.

The program storage unit 53 stores one of an image processing program 531 for removing noise of an image signal using an embodiment of the present invention, a video encoding program 532 for encoding a video signal using an embodiment of the present invention, and a video decoding program 533 for decoding an encoded bitstream using an embodiment of the present invention. The program storage unit 53 does not necessarily store all of these programs.

When the present system is used for removing noise of an image signal, the image processing program 531 is loaded on the memory 51, the CPU 50 sequentially fetches and executes instructions of the image processing program 531 loaded on the memory 51, inputs images of a video signal stored in the video signal storage unit 52, removes noise using the technique described in an embodiment of the present invention, and storage in the video signal storage unit 52 is performed.

Moreover, when the present system is used as a video encoding apparatus, the video encoding program 532 is loaded on the memory 51, the CPU 50 sequentially fetches and executes instructions of the video encoding program 532 loaded on the memory 51, encodes a video signal stored in the video signal storage unit 52 using the technique described in an embodiment of the present invention, and stores a bitstream as an encoding result in the encoded stream storage unit 54. Alternatively, the bitstream may be output to an external apparatus through an interface such as a network adapter.

Moreover, when the present system is used as a video decoding apparatus, the video decoding program 533 is loaded on the memory 51, the CPU 50 sequentially fetches and executes instructions of the video decoding program 533 loaded on the memory 51, decodes a bitstream stored in the encoded stream storage unit 54 using the technique described in an embodiment of the present invention, and stores a video signal as a decoding result in the video signal storage unit 52. Alternatively, the video signal as the decoding result is output to an external reproduction apparatus.

In particular, an embodiment of the present invention is used in a loop filter process in the video encoding program 532 and the video decoding program 533, and the program portion of this loop filter process can be shared by the video encoding program 532 and the video decoding program 533.

Although embodiments of the present invention have been described above in detail with reference to the drawings, the specific configuration is not limited to these embodiments, and designs and so on (addition, omission, replacement, and other modifications of configuration) that do not depart from the gist of the present invention are also included. The present invention is not restricted by the above description, and is restricted only by the attached claims.

INDUSTRIAL APPLICABILITY

For example, the present invention can be used for reducing noise at the time of taking an image and a deterioration of a deteriorated image. The present invention can reduce the computational complexity of a denoising filter while suppressing a reduction in coding efficiency.

DESCRIPTION OF REFERENCE NUMERALS 10, 11, 12, 13, 14 image processing apparatus
101, 111, 121, 131, 141 denoising filter processing unit
102, 112, 122, 132, 142 edge direction detection unit
103, 113, 123, 133, 143 search shape setting unit
104, 114, 124, 134, 144 NLM filter execution unit
115 denoising coefficient calculation unit
125, 135, 145 search shape storage unit
126, 136, 146 template shape storage unit
137, 147 denoising coefficient setting unit
138, 148 deviation degree detection unit
139, 149 template shape setting unit
1410 template shape resetting unit

The invention claimed is:

1. An image processing method which performs template matching between a template which is a comparison source for a denoising target pixel in a denoising target image and a template for each of search points which are search targets in a search shape in the denoising target image and removes noise of the target pixel with a weight in accordance with the degree of similarity between the templates and the weighted sum of pixel values at the search points, the method comprising:
    a step of calculating an edge direction using the denoising target image;
    a step of setting a search shape in which the number of search points along the direction perpendicular to the edge direction is smaller than the number of search points along the edge direction, using the calculated edge direction as an index used for limiting the search shape; and
    a step of executing a process of performing the template matching on only search points within the set search shape and removing the noise of the target pixel.

2. A non-transitory computer-readable medium storing instructions, the instructions causing a processor to perform the image processing method according to claim 1.

3. An image processing apparatus which performs template matching between a template which is a comparison source for a denoising target pixel in a denoising target image and a template for each of search points which are search targets in a search shape in the denoising target image and removes noise of the target pixel with a weight in accordance with the degree of similarity between the templates and the weighted sum of pixel values at the search points, the apparatus comprising:
    an edge direction detection circuit which calculates an edge direction using the denoising target image;
    a search shape setting circuit which sets a search shape in which the number of search points along the direction perpendicular to the edge direction is smaller than the number of search points along the edge direction, using the calculated edge direction as an index used for limiting the search shape; and
    a filter execution circuit which executes a process of performing the template matching on only search points within the set search shape and removing the noise of the target pixel.

4. A video encoding/decoding method which encodes or decodes video using a loop filter,
    the loop filter being a filter which removes noise of a decoded image using an image processing method that performs template matching between a template which is a comparison source for a denoising target pixel in the decoded image and a template for each of search points which are search targets in a search shape in the decoded image and removes noise of the target pixel with a weight in accordance with the degree of similarity between the templates and the weighted sum of pixel values at the search points,
    the video encoding/decoding method executing:
    a step of calculating an edge direction using the decoded image;
    a step of setting a search shape in which the number of search points along the direction perpendicular to the edge direction is smaller than the number of search points along the edge direction, using the calculated edge direction as an index used for limiting the search shape; and
    a step of executing a process of performing the template matching on only search points within the set search shape and removing the noise of the target pixel.

5. The video encoding/decoding method according to claim 4, wherein the loop filter further executes:
    a step of calculating the degree of deviation of the target pixel from a surrounding pixel of the target pixel using the decoded image; and
    a step of limiting a template shape so that the lower the degree of deviation relative to the maximum value of the degree of deviation within the decoded image is, the smaller the template shape is, using the degree of deviation as an index for limiting the template shape of the templates.

6. A non-transitory computer-readable medium storing instructions, the instructions causing a processor to perform the video encoding/decoding method according to claim 5.

7. A non-transitory computer-readable medium storing instructions, the instructions causing a processor to perform the video encoding/decoding method according to claim 4.

8. A video encoding/decoding apparatus which encodes or decodes video using a loop filter,
    the loop filter being a filter which removes noise of a decoded image using an image processing apparatus that performs template matching between a template which is a comparison source for a denoising target pixel in the decoded image and a template for each of search points which are search targets in a search shape in the decoded image and removes noise of the target pixel with a weight in accordance with the degree of similarity between the templates and the weighted sum of pixel values at the search points,
    the video encoding/decoding apparatus comprising:
    an edge direction detection circuit which calculates an edge direction using the decoded image;
    a search shape setting circuit which sets a search shape in which the number of search points along the direction perpendicular to the edge direction is smaller than the number of search points along the edge direction, using the calculated edge direction as an index used for limiting the search shape; and a filter execution circuit which executes a process of performing the template matching on only search points within the set search shape and removing the noise of the target pixel.

9. The video encoding/decoding apparatus according to claim 8, wherein the loop filter further comprises:

a deviation degree detection circuit which calculates the degree of deviation of the target pixel from a surrounding pixel of the target pixel using the decoded image; and a template shape setting circuit which limits a template shape so that the lower the degree of deviation relative to the maximum value of the degree of deviation within the decoded image is, the smaller the template shape is, using the degree of deviation as index for limiting the template shape of the templates.

* * * * *